(12) United States Patent
Ishii

(10) Patent No.: US 6,970,517 B2
(45) Date of Patent: Nov. 29, 2005

(54) INFORMATION TRANSMISSION SYSTEM FOR TRANSMITTING INFORMATION AMONG TERMINALS DIFFERENT IN MODULATION/DEMODULATION TECHNIQUES AND METHOD USED THEREIN

(75) Inventor: Jun Ishii, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 859 days.

(21) Appl. No.: 09/900,067

(22) Filed: Jul. 6, 2001

(65) Prior Publication Data

US 2002/0059312 A1 May 16, 2002

(30) Foreign Application Priority Data

Jul. 11, 2000 (JP) .............................. 2000-210510
Nov. 29, 2000 (JP) .............................. 2000-363725

(51) Int. Cl.$^7$ .......................................... H04L 27/00
(52) U.S. Cl. ..................................... 375/259; 455/102
(58) Field of Search ................................. 375/259, 295, 375/324, 326; 455/102, 142, 228

(56) References Cited

U.S. PATENT DOCUMENTS 6,185,259 B1 * 2/2001 Dent .......................... 375/261

* cited by examiner

Primary Examiner—Chieh M. Fan
Assistant Examiner—Kevin Kim
(74) Attorney, Agent, or Firm—Morrison & Foerster LLP

(57) ABSTRACT

An information transmission system is broken down into a sound recorder, a transmission medium and a sound reproducer; a digital audio signal is produced from MIDI music data words through any kind of modulation technique such as, for example, Y-modulation technique, P-modulation technique or Q-modulation technique, and the digital audio signal is transferred from the sound recorder through the transmission medium such as a magneto-optic disc, a wire communication network or the free space to the sound reproducer; when the digital audio signal reaches the sound reproducer, the sound reproducer analyzes the digital audio signal to see what modulation technique was employed to produce it, and demodulates the digital audio signal through an appropriate demodulation technique, thereby permitting user to employ any sound recorder to produce the digital audio signal.

27 Claims, 26 Drawing Sheets

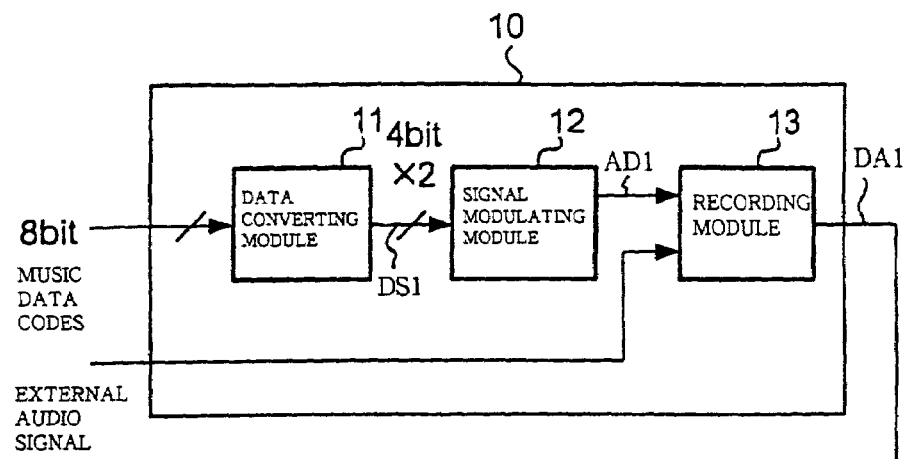
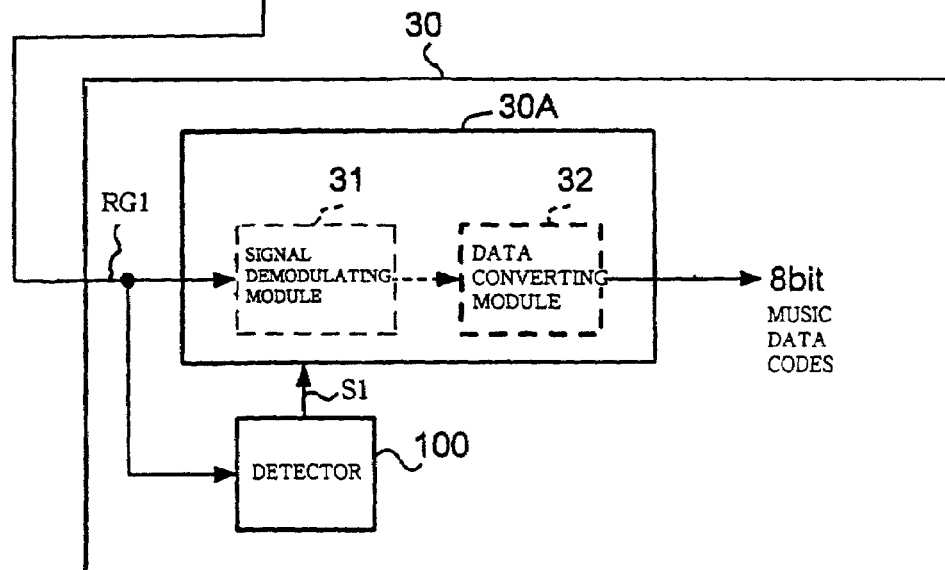
Fig. 1

Fig. 2

| ITEM | DESIGN | UNIT | NOTE |
|---|---|---|---|
| Recording channel for modulated signal | R | Channel | Audio signal is recorded in L-channel. |
| Bit rate | 12.6 | kbps (kilobits/sec.) | |
| Carrier frequency | 6.30 | KHz | |
| Symbol Velocity | 3.15 | K baud (kilo symbols/sec.) | |
| Bits of Symbol | 4 | bits/symbol | |
| Coding | 4 - bit gray code | | |
| Modulation | 16 DPSK | | |
| Demodulation | Synchronous detection | | |
| Synchronization | Synchronous nibble | | |
| Delay time of audio signal in recording | 0 | msec | |
| Delay time of audio signal in playback | 500 | msec | |
| Recording Level | -6.0 to -12.0 | dB | Relative value with respect to full range. |
| Silent period | 2.0 ≦ | second | Necessary for symchronization. |

| BIT STRING OF STATUS BYTE BEFORE DATA CONVERSION | BIT STRING AFTER DATA CONVERSION | DEFINITION OF STATUS BYTE |
|---|---|---|
| C0 | C40 | PROGRAM CHANGE AT CHANNEL 0 |
| C1 | C41 | PROGRAM CHANGE AT CHANNEL 1 |
| C2 | C42 | PROGRAM CHANGE AT CHANNEL 2 |
| ⋮ | ⋮ | ⋮ |
| CF | C4F | PROGRAM CHANGE AT CHANNEL F |
| F0 | C0 | EXCLUSIVE |
| F1 | C1 | TIME CODE QUARTER FRAME |
| F2 | C2 | SONG POSITION POINTER |
| F3 | C3 | SONG SELECT |
| F4 | C54 | ( NOT DEFINED ) |
| F5 | C55 | ( NOT DEFINED ) |
| F6 | C6 | TUNE REQUEST |
| F7 | C7 | END OF EXCLUSIVE |
| F8 | C8 | TIMING CLOCK |
| F9 | C9 | ( NOT DEFINED ) |
| FA | CA | START |
| FB | CB | CONTINUE |
| FC | CC | STOP |
| FD | CD | ( NOT DEFINED ) |
| FE | CE | ACTIVE SENSING |
| FF | CF | SYSTEM REQUEST |

Fig. 4

| Gray Code Data | POSITION [Dec] | PHASE [rad] | I – COMPONENT | Q – COMPONENT |
|---|---|---|---|---|
| 1000 | 0 | 0 | 1 | 0 |
| 1010 | 1 | 0.392699 | 0.92388 | 0.382683 |
| 1110 | 2 | 0.785398 | 0.707107 | 0.707107 |
| 0110 | 3 | 1.178097 | 0.382683 | 0.92388 |
| 0010 | 4 | 1.570796 | 0 | 1 |
| 0011 | 5 | 1.963495 | -0.38268 | 0.92388 |
| 0111 | 6 | 2.356194 | -0.70711 | 0.707107 |
| 1111 | 7 | 2.748894 | -0.92388 | 0.382683 |
| 1011 | 8 | 3.141593 | -1 | 0 |
| 1001 | 9 | 3.534292 | -0.92388 | -0.38268 |
| 1101 | 10 | 3.926991 | -0.70711 | -0.70711 |
| 0101 | 11 | 4.31969 | -0.38268 | -0.92388 |
| 0001 | 12 | 4.712389 | 0 | -1 |
| 0000 | 13 | 5.105088 | 0.382683 | -0.92388 |
| 0100 | 14 | 5.497787 | 0.707107 | -0.70711 |
| 1100 | 15 | 5.890486 | 0.92388 | -0.38268 |

Fig. 11

INFORMATION TRANSMISSION SYSTEM FOR TRANSMITTING INFORMATION AMONG TERMINALS DIFFERENT IN MODULATION/DEMODULATION TECHNIQUES AND METHOD USED THEREIN

FIELD OF THE INVENTION

This invention relates to information transmission technologies and, more particularly, to information transmission systems for transferring digital data signals through transmission media such as, for example, a portable information storage medium, communication cables and the free space and a method used therein.

DESCRIPTION OF THE RELATED ART

The MIDI (Musical Instrument Digital Interface) standards are popular to persons skilled in the art. A piece of music is stored in a set of music data codes formatted in accordance with the MIDI standards. The music data codes formatted in accordance with the MIDI standards are hereinbelow referred to as "MIDI music data codes".

A set of MIDI music data codes is transferred from a digital data source through a MIDI cable to a musical instrument such as, for example, an electric keyboard, and the original performance is reproduced. The set of MIDI music data codes may be transferred from another musical instrument in a real time fashion. Otherwise, the set of MIDI music data codes may be stored in an information storage medium such as a floppy disc or a compact disc.

The MIDI music data codes are usually written in the floppy disc without any modulation. Several modulation/demodulation techniques have been proposed for the MIDI music data codes. For example, the MIDI music data codes are modulated through a frequency shift keying. The MIDI music data code is represented by a pulse train or a series of marks and spaces. The MIDI music data codes are converted to a frequency modulated signal through the frequency shift keying, and the frequency modulated signal serves as an analog audio signal. The analog audio signal is sampled at a high frequency, and the discrete values are converted to a series of digital audio data codes through the pulse code modulation. The digital audio data signal is transmitted to the recording head, and is recorded into either right or left channel of the compact disc such as a CD-DA (Compact Disc Digital Audio).

However, the combination of the frequency shift keying and the pulse code modulation is not only one modulation technique available for the MIDI music data codes. Plural record companies produce the compact discs in Japan. The record companies employ different modulation techniques to record sets of MIDI music data codes in the compact discs. This means that a demodulation technique corresponding to the modulation technique is required for the playback. If the demodulation technique is not corresponding to the modulation technique, it is impossible to reproduce a piece of music from the MIDI music data codes stored in the compact disc. Thus, the problem inherent in the prior art recording/playback apparatus is poor compatibility.

The same problem is encountered in the prior art communication system. A provider is assumed to supply a set of MIDI music data codes representative of a piece of music through a communication line or the free space to users. If the provider modulates the set of MIDI music data codes to a digital audio signal through a certain modulating technique, the set of MIDI music data codes reaches users who own receivers capable of demodulating the digital audio signal to the set of MIDI music data codes. Thus, the poor compatibility is the problem inherent in the prior art communication system.

SUMMARY OF THE INVENTION

It is therefore an important object of the present invention to provide an information transmission system, which transfers an output data signal through various kinds of transmission media such as, for example, a portable memory, a wire communication network and the free space regardless of modulation/demodulation techniques employed in stations.

It is also an important object of the present invention to provided a method used in the information transmission system.

In accordance with one aspect of the present invention, there is provided an n information transmission system comprising a first station connected to a data source supplying data codes thereto at irregular interval and including a modulating unit producing a modulated signal on the basis of the data codes through a modulating technique selected from plural candidates and a data converting unit connected to the modulating unit for producing an output signal from the modulated signal, a second station supplied with the it signal of the data converting unit and including a discriminating unit analyzing the output signal so as to determine the modulating technique employed in the modulating unit and producing a control signal representative of the modulating technique and a demodulating unit supplied with the output signal of the data converting unit, capable of demodulating the output signal through any one of demodulating techniques respectively corresponding to the candidates and responsive to the control signal for reproducing the data codes through the demodulating technique corresponding to the modulating technique, and an information transmitting medium provided between the first station and the second station.

In accordance with another aspect of the present invention, there is provided a n information transmission system comprising a first station connected to a data source supplying data codes containing pieces of music data information representative of a performance thereto at irregular interval and including a first data converting unit supplying synchronous codes into the irregular intervals for producing a data stream, a modulating unit connected to the first data converting unit and modulating a carrier signal with the data stream for producing a modulated signal through a modulating technique selected from plural candidates and a second data converting unit connected to the modulating unit for producing an output signal from the modulated signal, a second station supplied with the output signal of the second data converting unit and including a discriminating unit analyzing the output signal so as to determine the modulating technique employed in the modulating unit and producing a control signal representative of the modulating technique, a demodulating unit supplied with the output signal of the second data converting unit, capable of demodulating the output signal through any one of demodulating techniques respectively corresponding to the candidates and responsive to the control signal for reproducing the data stream through the demodulating technique corresponding to the modulating technique and a third data converting unit connected to the demodulating unit and reproducing the data codes from the data stream, and an information transmitting medium provided between the first station and the second station.

In accordance with yet another aspect of the present invention, there is provided an information transmission system comprising a first station connected to a data source supplying data codes thereto at irregular interval, and including a modulating unit producing a modulated signal on the basis of the data codes through a modulating technique selected from plural candidates and a data converting unit connected to the modulating unit for producing an output signal from the modulated signal, the output signal having edge-to-edge intervals different between the candidates, a second station supplied with the output signal of the data converting unit and including a measuring unit for measuring the edge-to-edge intervals of the output signal, a discriminating unit connected to the measuring unit, determining the modulating technique employed in the modulating unit on the basis of the edge-to-edge intervals and producing a control signal representative of the modulating technique and a demodulating unit supplied with the output signal of the data converting unit, capable of demodulating the output signal through any one of demodulating techniques respectively corresponding to the candidates and responsive to the control signal for reproducing the data codes through the demodulating technique corresponding to the modulating technique, and an information transmitting medium provided between the first station and the second station.

In accordance with still another aspect of the present invention, there is provided a method for transmitting pieces of information from a first station to a second station comprising the steps of a) producing a modulated signal from data codes supplied from a data source at irregular intervals through a modulating technique selected from plural candidates, b) converting said modulated signal to an output signal, c) transmitting the output signal from the first station through an information transmitting medium to the second station, d) analyzing the output signal for determining the modulating technique, e) selecting a demodulating technique corresponding to the modulating technique from candidates corresponding to the plural candidates and f) reproducing the data codes through the demodulating technique.

BRIEF DESCRIPTION OF THE DRAWINGS

The features and advantages of the information transmission system and the method will be more clearly understood from the following description taken in conjunction with the accompanying drawings in which:

FIG. 1 is a block diagram showing the system configuration of a sound recording/reproducing system according to the present invention;

FIG. 2 is a view showing a specification for a sound recorder;

FIG. 4 is a view showing data nibbles of MIDI music data codes and dummy data codes corresponding thereto;

FIG. 11 is a view showing relation among gray codes, positions assigned to the gray codes, a relative phase and an I-Q coordinate system;

DESCRIPTION OF THE PREFERRED EMBODIMENTS

First Embodiment

System Configuration

Figure 3:
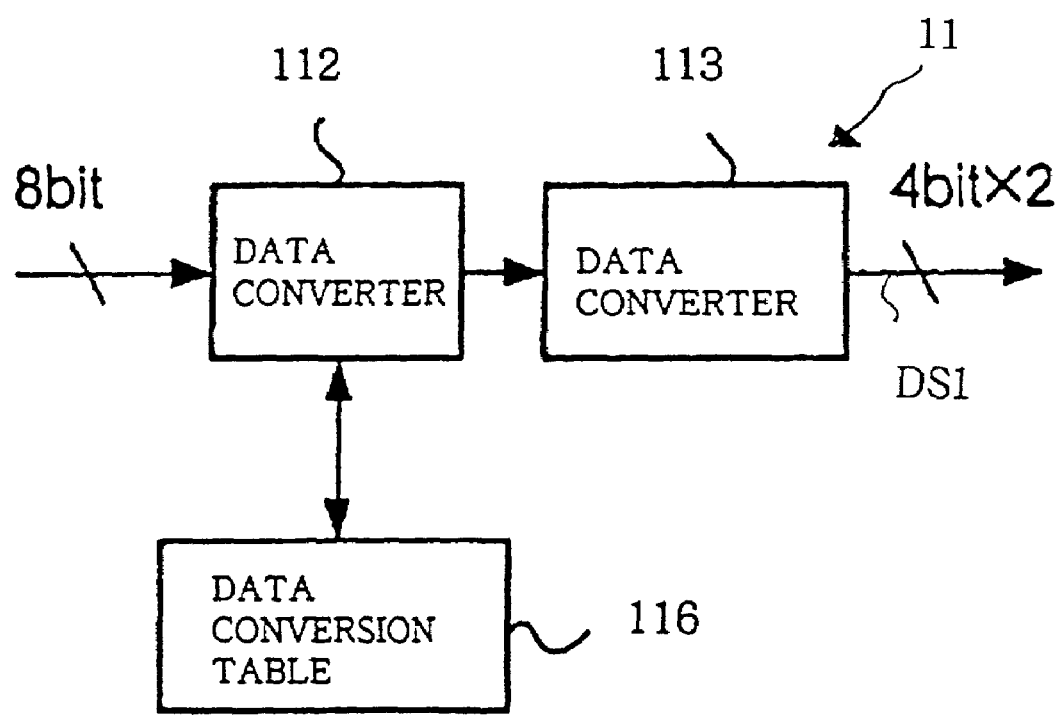
FIG. 3 is a block diagram showing the circuit configuration of a data converting module incorporated in the sound recorder.
Figure 5:
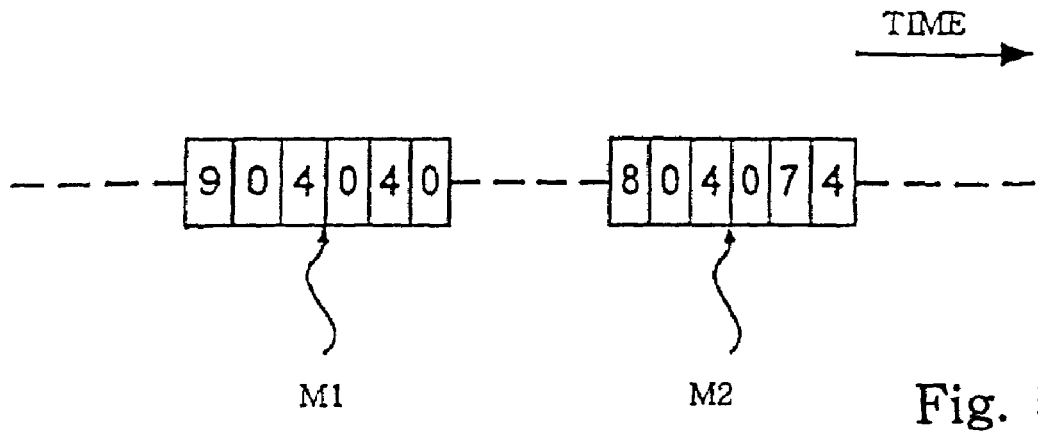
FIG. 5 is a view showing MIDI data words produced in a performance on an electric keyboard.

Referring to FIG. 1 of the drawing, a sound recording/reproducing system embodying the present invention largely comprises a sound recorder 10, an information storage medium 20 and a sound reproducer 30. A data source such as, for example, an electric keyboard is connected to the sound recorder 10, and 8-bit music data codes representative of pieces of music are supplied from the data source to the sound recorder 10. In this instance, the 8-bit music data codes are formatted in accordance with the MIDI standards, and are hereinbelow referred to as "MIDI music data codes". The sound recorder 10 produces a digital audio signal DA1 from the MIDI music data codes through a modulation technique, and writes the digital audio signal DA1 into the information storage medium 20. Thus, the pieces of music are stored in the information storage medium 20. Any limit is not set on the modulation technique. In other words, the sound recorder 10 is replaceable with another sound recorder in which another modulation technique is employed. A magneto-optic disc serves as the information storage medium 20, by way of example. The magneto-optic disc may be CD-R (Compact Disc Recordable) or DVD-R (Digital Video Disc Recordable or Digital Versatile Disc Recordable).

The sound reproducer 30 reads out the pieces of music from the magneto-optic disc 20, and produces a regenerative signal RG1. The regenerative signal RG1 is representative of the pieces of music. However, the regenerative signal RG1 may represent another kind of data information such as, for example, commands to the sound reproducer 30 or other apparatus connected to the sound reproducer 30. The regenerative signal RG1 is demodulated, and the MIDI music data codes are reproduced. Even if another piece of music is stored in a magneto-optic disc 20 through another modulation technique different from that employed in the sound recorder 10, the sound reproducer 30 produces MIDI music data codes representative of another piece of music from the regenerative signal RG1. The MIDI music data codes are converted to an analog audio signal, and electronic sound is produced from the analog audio signal.

The sound reproducer 30 includes a demodulator 30A, a detector 100, a tone generator (not shown) and a sound system (not shown). The regenerative signal RG1 is supplied to both of the demodulator 30A and the detector 100. The detector 100 checks the regenerative signal RG1 to see what modulation technique is employed to produce the analog audio signal AD1, and decides the modulation technique or uncertainty. The detector 100 produces a status signal S1 representative of the modulation technique or the uncertainty, and supplies the status signal S1 to the demodulator 30A. The demodulator 30A can process the regenerative signal RG1 through plural demodulation techniques. The demodulator 30A is responsive to the status signal Si representative of the modulation technique so as to process the regenerative signal RG1 through selected one of the demodulation techniques corresponding to the modulation technique notified by the detector 100. The demodulator 30A reproduces the MIDI music data codes representative of the pieces of music, and supplies the MIDI music data codes to the tone generator (not shown). The tone generator generates the analog audio signal from the digital audio signal, and supplies the analog audio signal to the sound system (not shown).

Sound Recorder

Various manufacturers supply the market with the sound recorders 10. As described hereinbefore, the manufacturers employs different modulation techniques to produce the digital audio signal from the MIDI music data codes. Followings are the specifications of the manufacturers for the sound recorders 10.

Specification of Manufacturer A
1. MIDI music data codes are modulated to a digital audio signal through a 16 DPSK (Differential Phase-Shift Keying), and the modulation technique is categorized in Y-modulation.
2. The digital audio signal is supplied through the right channel, and is written in an information storage medium in case where the information storage medium is responsive to 2-channel digital audio signal.
3. The base-band signal of the modulated signal or the digital audio signal is in the form of a pulse train, which has the edge-to-edge intervals expressed as 317.5×n $\mu$s where n is a positive number.

Specification of Manufacturer B
1. MIDI music data codes are modulated to a digital audio signal through a binary FSK (Frequency Shift Keying), and the modulation technique is categorized in Q-modulation.
2. The digital audio signal is supplied through the left channel, and is written in an information storage medium in case where the information storage medium is responsive to 2-channel digital audio signal.
3. The base-band signal of the modulated signal or the digital audio signal is in the form of pulse train, which has the edge-to-edge intervals selected from the group consisting of 145 $\mu$s, 290 $\mu$s, 581 $\mu$s and 3855 $\mu$s Specification of Manufacturer C
1. MIDI music data codes are modulated to a digital audio signal through a binary FSK (Frequency Shift Keying), and the modulation technique is categorized in P-modulation, which is different from the Q-modulation.
2. The digital audio signal is supplied through the right channel, and is written in an information storage medium in case where the information storage medium is responsive to 2-channel digital audio signal.
3. The base-band signal of the modulated signal or the digital audio signal is in the form of pulse train, which has the edge-to-edge intervals selected from the group consisting of 259 $\mu$s and 129.5 $\mu$s.

Since the Q-modulation and the P-modulation, which the binary FSK is used in, are well known, description is hereinbelow made on the Y-modulation through the 16 DPSK employed in the specification of manufacturer A.

FIG. 2 illustrates details of the specification employed by manufacturer A. The modulated signal is assigned to the right channel R. If a compact disc serves as the information storage medium 20, an audio signal is recorded in the left channel L. The bit rate is 12.6 kbps. The start/stop commands are required for pieces of music data information stored in the form of MIDI music data codes. The bit rate of 12.6 kbps is large enough to transfer the other music codes. The carrier frequency is 6.30 kHz, and the symbol velocity is 3.15 kbaud. Each symbol is expressed by 4 bits. The symbols are converted to 4-bit gray codes, and the 4-bit gray codes are modulated through the 16-DPSK. A synchronous detection is employed to demodulate the audio signal. Synchronization is achieved by inserting synchronous nibbles into between MIDI music data codes. The audio-signal delay time is zero millisecond in the recording, and is 500 milliseconds in the reproduction. The dynamic range is from −6.0 dB to −12.0 dB with respect to the full range. Silence is continued for at least two seconds until a piece of music starts, and the silent time period is necessary for synchronization. In other words, the manufacturer designs the silent time period to achieve the synchronization. A base-band filter is prepared for the modulated signal, and a fourteenth-order cosine roll-off low-pass filter is employed as the base-band filter. The cosine roll-off low-pass filter has the cut-off frequency corresponding to the carrier frequency at 6.3 kHz.

Turning back to FIG. 1, the sound recorder 10 is assumed to be a product of manufacturer A. The sound recorder 10 includes a data converting module 11, a signal modulating module 12 and a recording module 13. The MIDI music data codes are asynchronously supplied from the data source, i.e., the electric keyboard to the data converting module 11. In other words, the MIDI music data codes representative of pieces of MIDI music data information are supplied from the data source to the sound recorder 10 at irregular intervals.

According to the MIDI standards, the MIDI messages are stored in 8-bit data codes. Plural 8-bit data codes are required for transferring each MIDI message. In other words, each MIDI message is represented by using a status byte and data bytes. The status byte is, by way of example, representative of an instruction such as a note-on/note-off and a channel to be assigned. Each of the note-on/note-off and the channel to be assigned are represented by higher 4 bits and lower 4 bits. Thus, the nibble is the unit of the MIDI data word. On the other hand, the data bytes give details of the instruction. The number of data bytes is determined for each of the status bytes in the MIDI standards. The status byte representative of a note-on is, by way of example, followed by two data bytes. The first data byte is indicative of the pitch of the tone to be generated, and the second data byte is indicative of the loudness of the tone to be generated. Thus, the MIDI message is an instruction for generating the tone with a pitch at certain loudness. In the following description, a set of status/data bytes representative of a MIDI message is referred to as "MIDI data word", and the status byte and the data byte defined in the MIDI standards are referred to as "MIDI status byte" and "MIDI data byte", respectively.

The 8-bit MIDI status/data is divisible into two data nibbles. The data converting module 11 checks the MIDI data words to see whether or not the MIDI status bytes are discriminative after insertion of a 4-bit synchronous nibble or nibbles. The synchronous nibble will be hereinbelow described in detail. When the data converting module 11 notices a MIDI status byte which loses the peculiarity after the insertion of the synchronous nibble, the data converting module 11 replaces the MIDI status byte with a quasi MIDI status code. The other MIDI status bytes are not replaced with any quasi MIDI status code, and the data bytes are transferred without any replacement. Subsequently, the data converting module 11 inserts the synchronous nibbles into the irregular intervals, and produces a nibble stream DS1. Thus, the nibble steam NS is divisible into a series of nibbles, and, for this reason, each nibble is referred to as "symbol". Although the synchronous nibbles are inserted into the irregular intervals, the data converting module 11 keeps the MIDI status bytes, quasi MIDI status bytes and MIDI data bytes discriminative. The nibble stream DS1 is supplied from the data converting module 11 to the signal modulating module 12.

The signal modulating module 12 modulates a carrier signal with the nibble stream DS1, and produces an analog audio signal AD1. The carrier signal is fallen within the audio frequency band. The analog audio signal AD1 is supplied from the signal modulating module 12 to a recording module 13. An external analog audio signal and/or an external digital audio signal may be further supplied to the recording module 13. The recording module 13 converts the analog audio signal AD1 to the digital audio signal DA1 through the pulse code modulation, i.e., PCM, and writes the digital audio signal DA1 into a track in the magneto-optic disc 20.

Data Converting Module

Turning to FIG. 3 of the drawings, the function of the data converter 11 is equivalent to functions of two data converters 112/113 associated with a data conversion table 116. The data converter 112 replaces confusing MIDI status bytes with quasi MIDI status codes with the assistance of the data conversion table 116, and the data converter 113 produces the nibble stream DS1.

In detail, the MIDI data words are asynchronously produced in the electric keyboard, and are supplied from the electric keyboard to the data converting module 11 at irregular intervals. The data converter 112 receives the MIDI music data words, and checks the MIDI data words to see whether or not any one of the MIDI status bytes contains a nibble to be confused with the synchronous nibble or a nibble forming a part of another MIDI status byte. If the MIDI status byte does not contain the synchronous nibble and the confusing nibble, the answer is given negative, and the data converter 112 passes the MIDI status byte and associated MIDI data bytes to the data converter 113. However, if the MIDI status byte contains the synchronous nibble or the confusing nibble, the answer is given affirmative, and the data converter 112 accesses the data conversion table 116, and searches the data conversion table 116 for an appropriate quasi MIDI status byte. When the data converter 112 finds the appropriate quasi MIDI status byte in the data conversion table 116, the data converter 112 fetches the quasi MIDI status code corresponding to the MIDI status byte, and supplies the quasi MIDI status code and the MIDI data bytes to the data converter 113.

The data converter 113 supplements the synchronous nibbles in the irregular intervals between the MIDI data words, and produces the nibble stream DS1. In this instance, the synchronous nibble has the bit string (1111). The bit string (1111) is equivalent to hexadecimal number F.

FIG. 4 shows the data conversion table 116. The data conversion table 116 is stored in a memory device. The data conversion table 116 defines relation between MIDI status bytes and quasi MIDI status codes. The quasi MIDI status codes are different from the MIDI standards. However, the quasi MIDI status codes convey the pieces of status data information stored in the corresponding MIDI status bytes from the data converter 112 to the sound reproducer 30.

The data conversion table 116 shown in FIG. 4 includes the leftmost column assigned to the MIDI status bytes and the central column assigned to the quasi MIDI status codes and the rightmost column assigned to the definition of the MIDI status bytes. The actual data conversion table 116 relates the most significant nibbles of the MIDI status bytes to the quasi MIDI status codes, only. The rightmost column is added for the sake of reference. When the MIDI status bytes are replaced with the quasi MIDI status codes, the quasi MIDI status codes form the quasi MIDI data words together with the associated MIDI data bytes. In the following description, hexadecimal numbers are respectively placed in pairs of brackets.

The particular MIDI status bytes are expressed by the bit strings equivalent to hexadecimal numbers [C0] to [CF] and [F0] to [FF], respectively. These MIDI status bytes have the most significant nibble expressed by hexadecimal number [F] or [C]. The most significant nibble [F] is changed to the bit string equivalent to [C], and, accordingly, the most significant nibble [C] is changed to the bit string equivalent to [C4]. The MIDI status bytes [F4] and [F5] are changed to the quasi MIDI status data codes [C54] and [C55], respectively. Thus, the most significant nibble [F] is removed from the quasi MIDI status codes through the data conversion.

The reason why the most significant nibble [F] is replaced with the data nibble [C] is that only a small number of MIDI status bytes have the most significant nibble [F] and that the MIDI status bytes with the most significant nibble [F] represent system messages which do not frequently appear in a series of MIDI data words representative of a performance. In order to discriminate the converted data nibble [C] from the data nibble [C] originally incorporated in other MIDI status bytes, the most significant nibble [C] of the MIDI status bytes is replaced with the data code equivalent to hexadecimal numbers [C4]. The MIDI status bytes with the most significant nibble [C] represent the program change, and the program change does not frequently occur. The MIDI status byte with the most significant nibble [C] is prolonged by adding the nibble [4] thereto, and the data processing is a little bit delayed due to the added nibble [4]. However, the real time data processing is not required for the program change. A piece of music data information seldom follows the program change, and the delay is ignoreable. Moreover, the added nibble [4] is so short that the quasi MIDI data words do not lower the transfer efficiency.

The MIDI status bytes [F4] and [F5] are further changed to the quasi MIDI status codes [C54] and [C55], respectively, because the MIDI status bytes [C0] to [CF] have been already changed to the quasi MIDI status data codes [C4x] (x=0, 1, 2, . . . F). As will be seen in the table shown in FIG. 4, the status bytes [F4] and [F5] are not defined in the MIDI standards. There is little possibility to transmit the MIDI data words qualified with the status bytes [F4] and [F5]. However, those status bytes [F4] and [F5] may be defined in future. Moreover, it is desirable to make the conversion table clear, and the added data nibble [5] is ignoreable in the data transmission. For this reason, the MIDI status bytes [F4] and [F5] are respectively changed to the quasi MIDI status codes [C54] and [C55].

While the electric keyboard is transferring the MIDI data words to the data converter 112 at irregular intervals, the data converter 112 checks each MIDI music data word to see whether or not the MIDI status byte is fallen within the prohibited range between [C0] and [CF] and between [F0] and [FF]. If the MIDI music data word has the MIDI status byte fallen within the prohibited range, the data converter 112 accesses the data conversion table 116, and reads out the corresponding quasi MIDI status data byte from the data conversion table 116 for replacing the prohibited MIDI status byte with the quasi MIDI status code read out from the data conversion table 116. Upon completion of the data conversion, the MIDI data words are out of the definition of the MIDI standards. However, the quasi MIDI data codes still represent the MIDI message, because the quasi MIDI status codes are discriminative from each other and from the other MIDI status bytes. The MIDI data word is converted to the quasi MIDI data word through the data conversion. The data converter 112 supplies the quasi MIDI data word to the data converter 13.

On the other hand, when a MIDI status byte is out of the prohibited range, the MIDI status byte does not require the data conversion. This means that the data converter 112 does not replace the MIDI status byte with any quasi MIDI status code. The data converter 112 transfers the MIDI data word to the data converter 13 without the data conversion. Nevertheless, the MIDI data words are also referred to as "quasi MIDI data word" between the data converter 112 and the sound reproducer 30.

The data converter 113 receives the quasi MIDI data words from the data converter 12, and forms the nibble stream DS1 for the synchronous data transmission. Since the quasi MIDI data words intermittently reach the data converter 113, the data converter 113 supplements the synchronous nibble or nibbles [F] into the irregular intervals among the quasi MIDI data words. As described hereinbefore, the hexadecimal number [F] has been already eliminated from the MIDI status bytes, and the synchronous data nibble [F] is never confused with the most significant nibble of the MIDI status bytes. The nibble stream DS1 is supplied to the signal modulation module 11.

Assuming now that a musician is playing a tune on the electric keyboard, the electric keyboard produces MIDI data words representative of the performance in response to the finger work. The MIDI data words are asynchronously transferred from the electric keyboard 4 to the sound recorder 10, and, accordingly, are a kind of asynchronous data.

Figure 6:
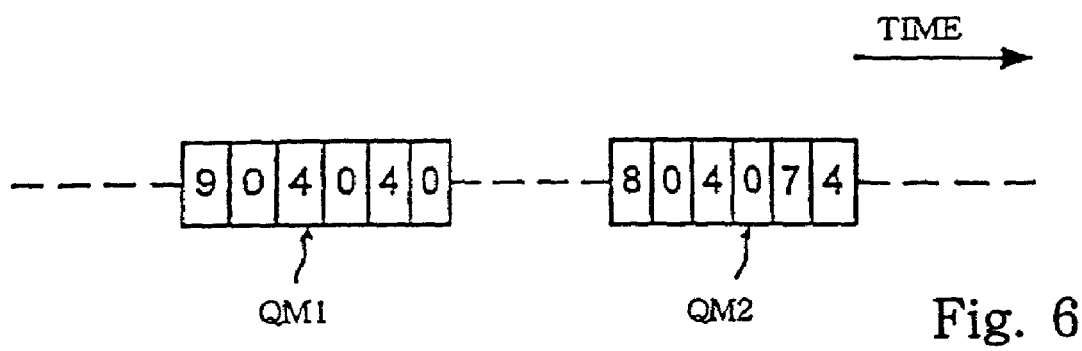
FIG. 6 is a view showing quasi MIDI data words produced from the MIDI data words through the data conversion.
Figure 7:
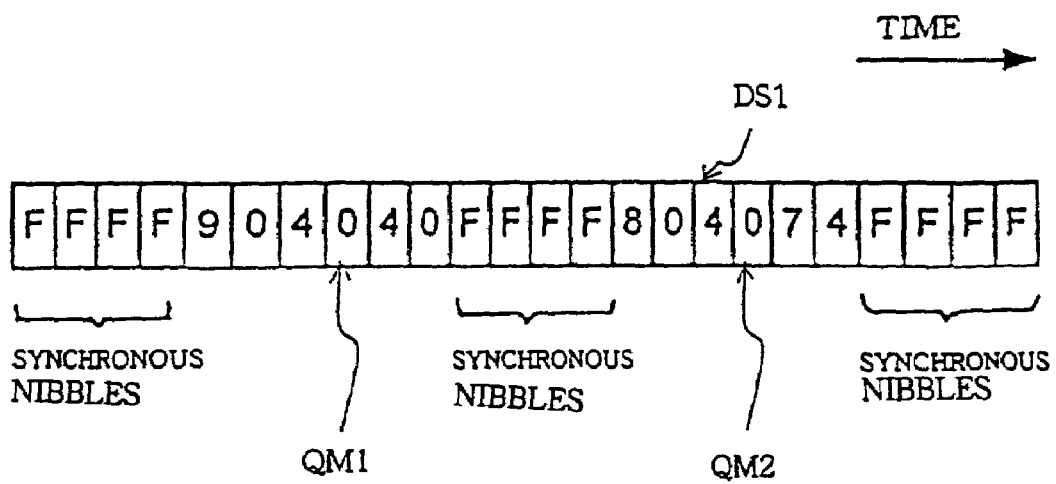
FIG. 7 is a view showing a nibble stream output from the data converting module.

FIG. 6 shows two of the MIDI data words representative of the MIDI messages. Time runs as indicated by an arrow. The first MIDI data word MI is equivalent to hexadecimal number [904040], and the second MIDI data word M2 is equivalent to hexadecimal number [804074]. The MIDI data words M1 and M2 are spaced from each other and further from other MIDI music data words on both sides thereof, and broken lines represents the irregular time intervals. The data converter 112 checks each MIDI music data word M1/M2 to see whether or not the MIDI status byte has the most significant nibble equal to hexadecimal numbers [F] or [C]. The most significant nibbles of the MIDI music data words M1 and M2 are [9] and [8], respectively, and the answer is given negative. The data converter 112 does not access the data conversion table 116, and transfers the MIDI data words M1 and M2 to the next data converter 113 as the quasi MIDI music data words QM1 and QM2 (see FIG. 6). The quasi MIDI music data words QM1 and QM2 are also spaced from each other and further from the other quasi MIDI music data words as indicated by broken lines.

Figure 8:
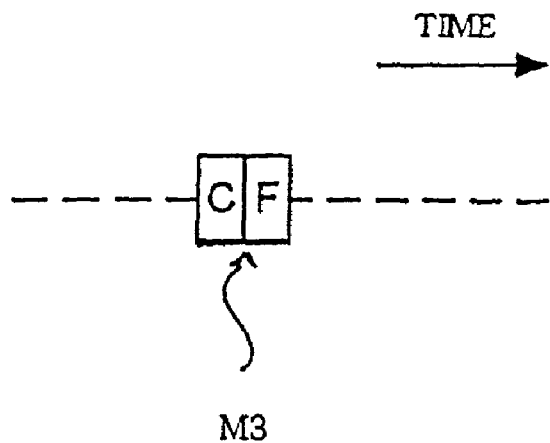
FIG. 8 is a view showing another MIDI data word produced in the performance on the electric keyboard.

The data converter 113 supplements the synchronous nibbles [F] between the adjacent two quasi MIDI music data words, and converts the quasi MIDI data words . . . , QM1, QM2, . . . to the nibble stream DS1 as shown in FIG. 8. The synchronous data nibbles [F] serve as the stuffing pulses in a justification technology, and the nibble stream DS1 is a kind of synchronous data.

Figure 9:
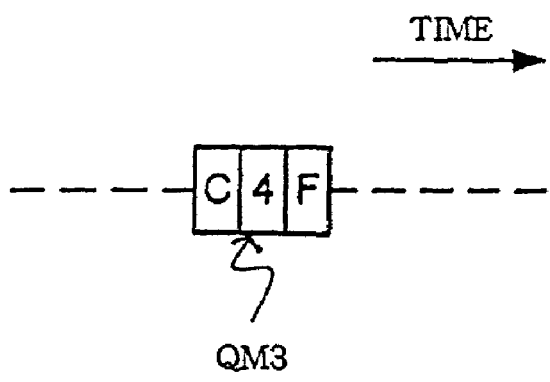
FIG. 9 is a view showing a quasi MIDI data word produced from the MIDI data word.
Figure 10:
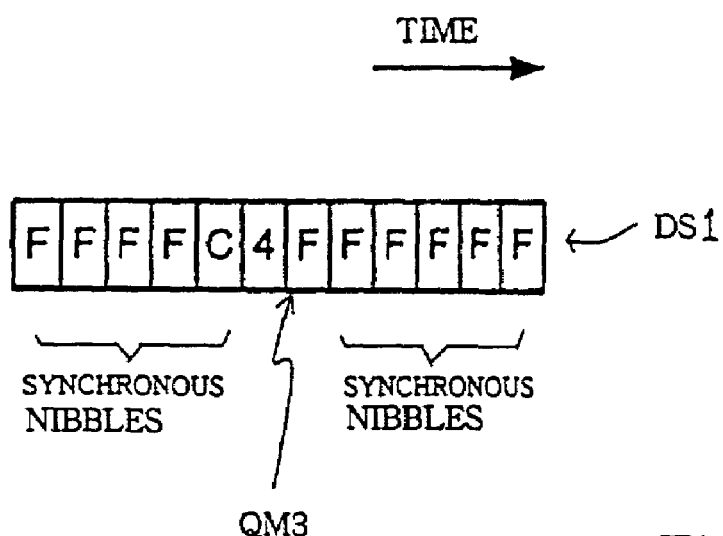
FIG. 10 is a view showing the quasi MIDI data word taken into the data stream.

After the MIDI music data word M2, the electric keyboard produces another MIDI data word M3 (see FIG. 8), and supplies the MIDI data word M3 to the data converter 112. The MIDI data words M3 contains the status byte [CF] representative of the program change at channel F (see FIG. 4). The data converter 112 checks the MIDI data word M3 to see whether or not the MIDI status byte is to be converted to a quasi MIDI status code. The MIDI status byte [CF] is fallen within the prohibit range, and the answer is given affirmative. Then, the data converter 112 accesses the data conversion table 116, and fetches the quasi MIDI status code [C4F] from the data conversion table 116. The data converter 112 replaces the MIDI status byte [CF] with the quasi MIDI status code [C4F], and produces a quasi MIDI music data word QM3 as shown in FIG. 9. The data converter 112 supplies the quasi MIDI data word QM3 to the data converter 113, and the data converter 113 supplements the synchronous nibble [F] into the irregular time intervals between the previous quasi MIDI data word and the quasi MIDI data word QM3 and between the quasi MIDI data word QM3 and the next quasi MIDI data word as shown in FIG. 10. Thus, the quasi MIDI music data word QM3 is taken into the nibble stream DS1.

Signal Modulation Module

The signal modulating module 12 successively changes the nibbles of the nibble stream DS1 to corresponding gray codes, and repeatedly adds a phase equivalent to the present gray code to the phase equivalent to the previous gray code for producing a modulating signal representative of the phase of the present data nibble. In other words, the signal modulation module 12 accumulates the values of the phase for producing the modulating signal. The reason for the accumulation is that, even if the synchronous nibbles [F] are continued, the sound reproducer 30 achieves the synchronization through the phase continuously varied. Thus, the signal modulation module 12 produces the modulating signal representative of the phase of the present nibble. Subsequently, the signal modulation module 12 modules the carrier signal with the modulating signal, and produces the analog audio data signal AD1.

Figure 12:
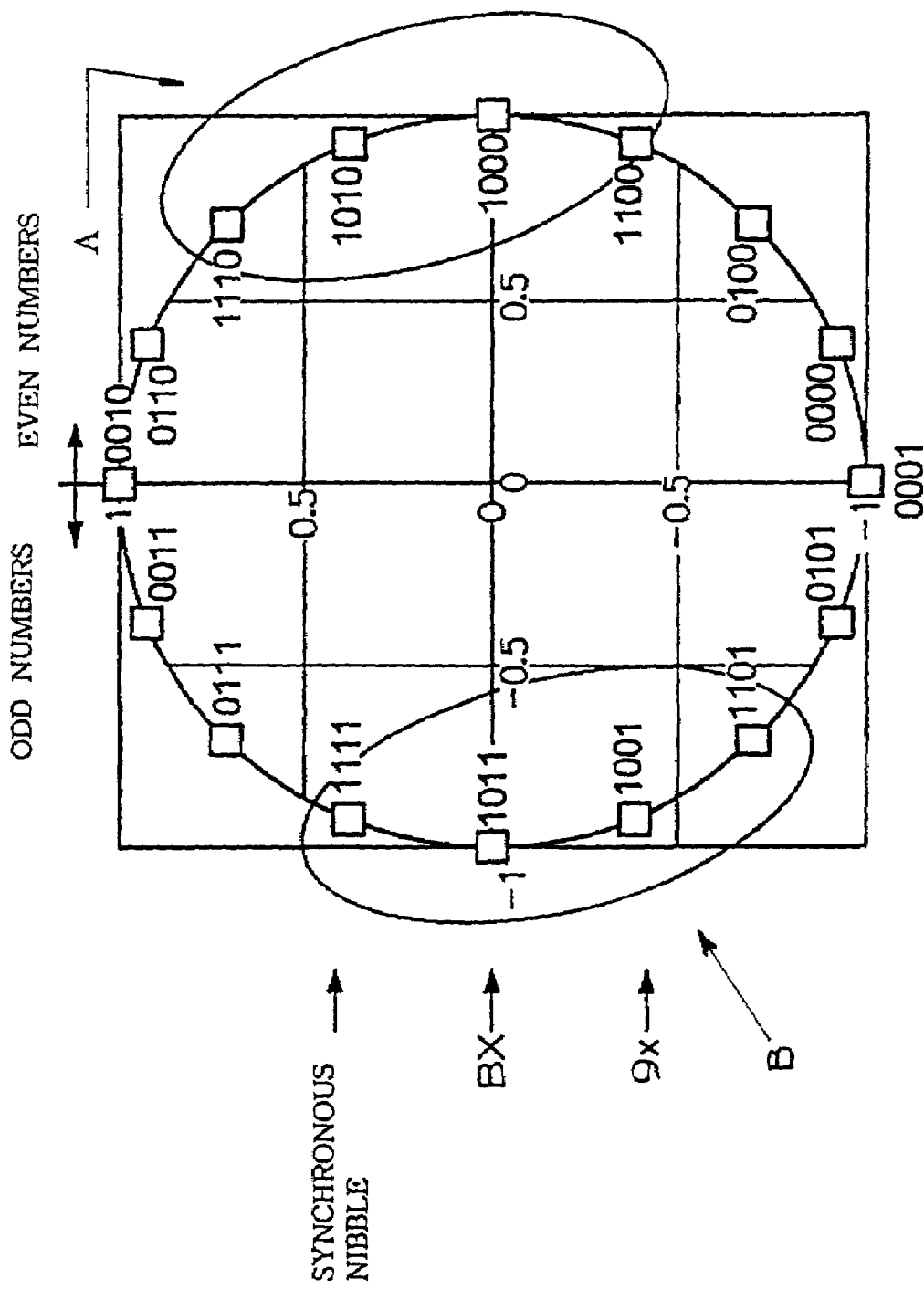
FIG. 12 is a graph showing a spacious arrangement of the gray codes.
Figure 21:
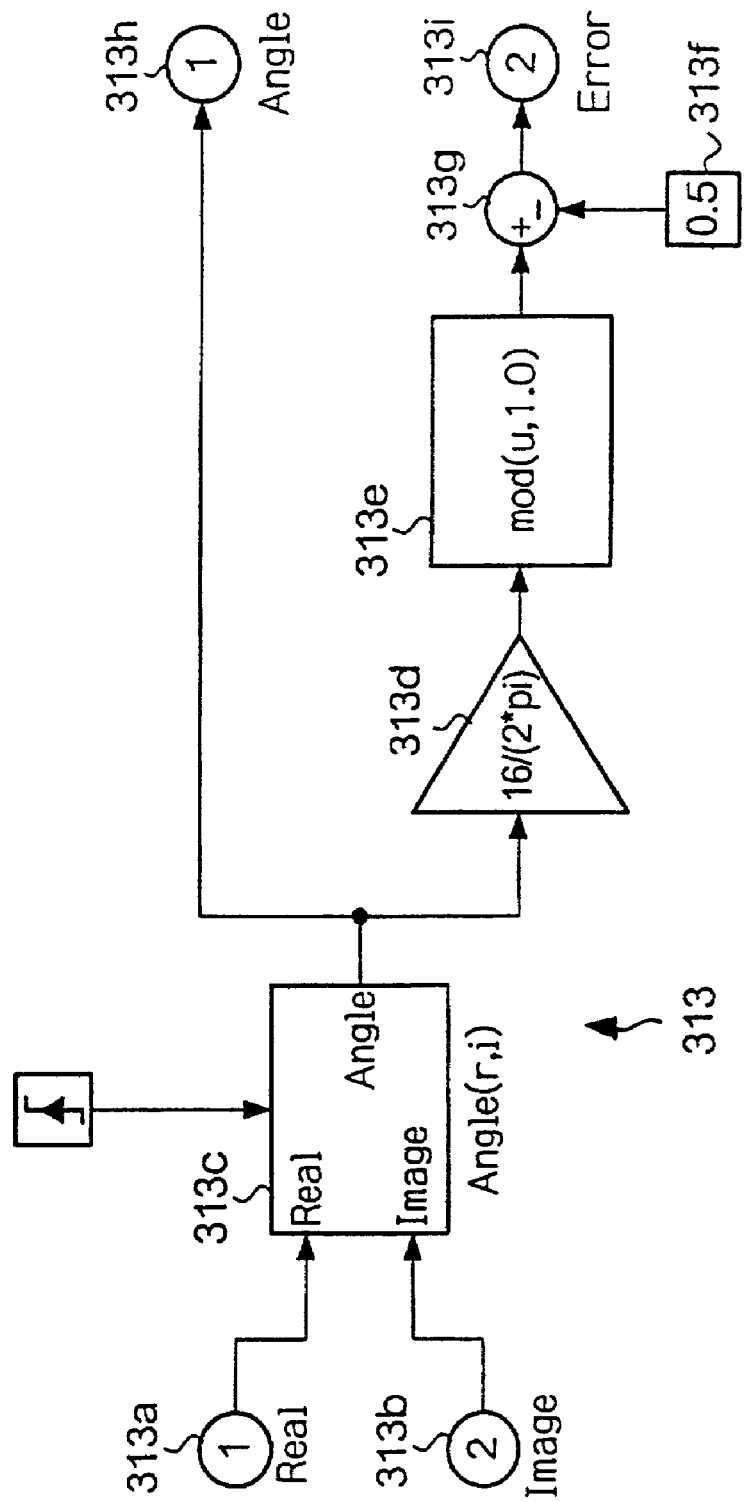
FIG. 21 is a block diagram showing the circuit configuration of a coordinate transformation circuit incorporated in the signal demodulation circuit.

FIG. 11 shows the relation among sixteen 4-bit gray codes, relative phase or the phase differences and I and Q components of Q-I coordinate system. FIG. 12 shows the relation between I-component and Q-component in the Q-I coordinate system. The second column from the left side in FIG. 21 is assigned to the position on the circle shown in FIG. 12.

In the Q-I coordinate system, 157.5 degrees is assigned to the gray code (1111) equivalent to the hexadecimal number [F], and the gray codes are arranged on the circle in the counter clockwise direction. Since the gray code [F] is positioned at 157.5 degrees, it is guaranteed that the phase is stepwise varied during the reception of the synchronous nibbles [F]. This means that the synchronization is surely achieved in the sound reproducer 30. In case where the MIDI status bytes are alternated with the MIDI data bytes, it is appropriate to make the relative phase between the gray codes as large as possible The MIDI status byte is usually alternated with the MIDI status data byte or bytes. For this reason, the gray codes greater than [8] and the gray codes less than [8] are appropriately assigned in the vicinity of 0/180 degrees and in the vicinity of 90/270 degrees in the Q-I coordinate system. The relative phase of zero is assigned to the gray code [8]. The phase is surely varied in so far as the gray code is not changed as [8] - [8] - [8] - [8] - [8]. These patterns are seldom in the data stream DS1 containing the MIDI music data words. For this reason, any scramble is not required.

In detail, the MIDI status byte and the MIDI data byte or bytes alternately appear in the nibble stream DS1. The MIDI status byte has the first nibble the bit 3 of which is value 1. On the other hand, the MIDI data byte has the first nibble the bit 3 of which is value 0. When the MIDI music data words are separated into nibbles, it is guaranteed that the most significant bits or bits 3 do not continuously take value 1. In the spacious arrangement for the modulating signal shown in FIGS. 11 and 12, the nibbles with bit 3 of 1 are assigned the positions in the vicinity of relative phase 0 so as not to continue relative phases around zero degree (see zone A in FIG. 12). If the data are continued to be around zero degrees, it is difficult to detect the boundary between the nibbles. This results in that the demodulated signal is liable to be out of the synchronization. The demodulated signal is less liable to be out of the synchronization by virtue of the above-described spacious arrangement for the modulating signal. The silent signal (1111) in the nibble stream DS1 has the most significant nibble corresponding to the gray code (1011), and the MIDI message representative of the control change [Bxxxxx] where x is indefiniteness also has the most significant nibble corresponding to the gray code (1011). The MIDI status byte representative of the note-on [90xxxx] has the most significant nibble corresponding to the gray code (1001). These are frequently generated in a performance. In this situation, the corresponding gray codes are located in the vicinity of 180 degrees (see zone B) so as to make the detection of the change in the data stream DS1 easy.

Circuit Configuration of Signal Modulation Module

Figure 13:
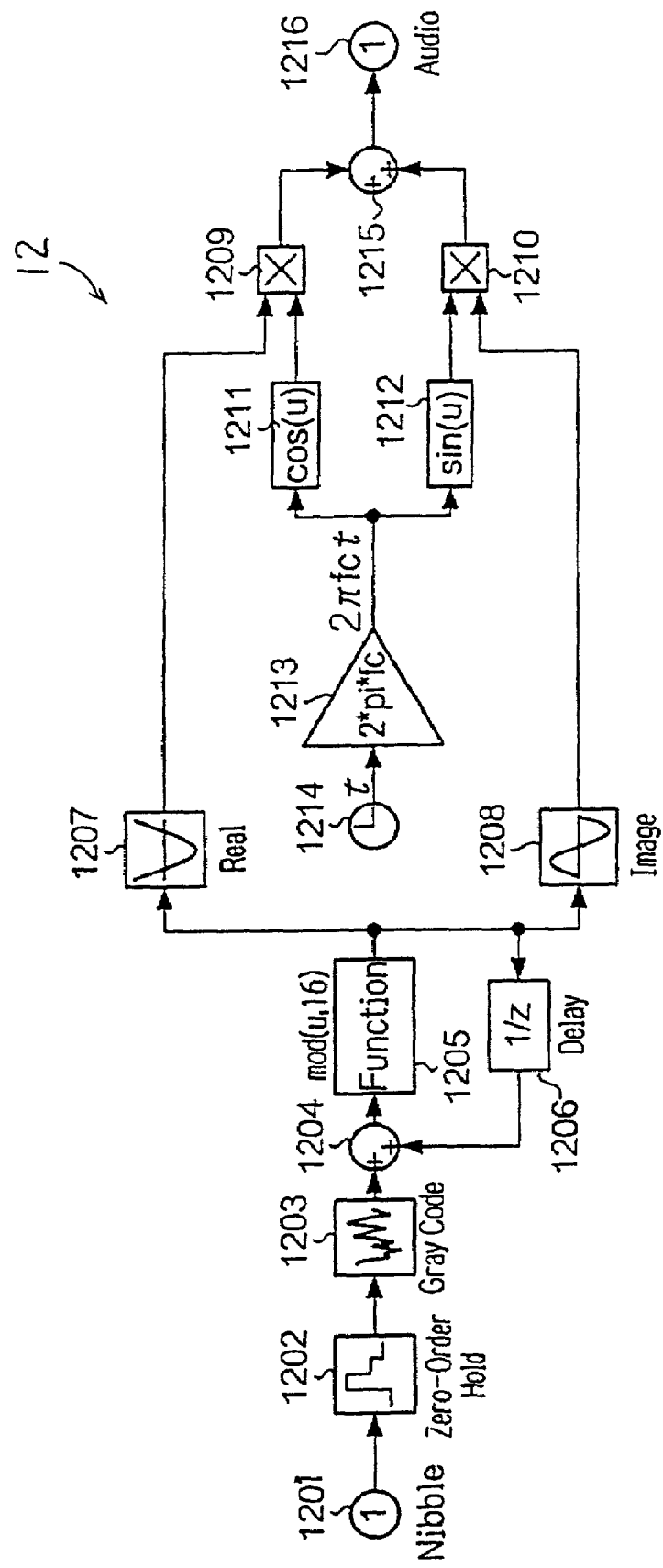
FIG. 13 is a block diagram showing the circuit configuration of a signal modulation module incorporated in the recording unit.

The signal modulation module 12 is hereinbelow described in detail with reference to FIG. 13. FIG. 13 shows the circuit configuration of the signal modulation module 12. The signal modulation module 12 includes a zero-order hold circuit 1202 and a gray code generator 1203. The zero-order hold circuit 1202 is connected to an input port 1201 of the signal modulation module 12, and the nibble stream DS1 is supplied from the input port 1201 to the zero-order hold circuit 1202. The zero-order hold circuit 1202 latches each data nibble, and maintains the data nibble until the next data nibble reaches. While the zero-order hold circuit 1202 holds a data nibble, the data nibble is supplied to the gray code generator 1203. The gray code generator 1203 converts the data nibble to the 4-bit gray code corresponding thereto. The 4-bit gray code is representative of the relative phase as described hereinbefore.

The signal modulation module 12 further includes an adder 1204, a modulo function unit 1205 and a delay circuit 1206. The gray code generator 1203 is connected to the first input port of the adder 1204, and the output port of the adder 1204 is connected to the modulo function unit 1205. The output port of the modulo function unit 1205 is connected through the delay circuit 1206 to the second input port of the adder 1204. Thus, the adder 1204, the modulo function unit 1205 and the delay circuit 1206 form an accumulation loop for producing a 4-bit data code representative of an absolute phase from the given 4-bit gray codes representative of the relative phases. In detail, the modulo function unit 1205 divides the sum by sixteen, and outputs a 4-bit data code representative of the remainder. The remainder is representative of the absolute phase. The delay circuit 1206 introduce a time delay into the propagation of the 4-bit data code representative of the remainder from the modulo function unit 1205 to the second input port of the adder 1204. The next gray code reaches the first input port of the adder 1204, and the remainder is added to the value of the next gray code. Thus, the values of the relative phase or the phase differences are accumulated through the accumulation loop 1204, 1205 and 1206, and the 4-bit data code representative of the absolute phase is output from the modulo function unit 1205. The zero-order hold circuit 1202 and the gray code generator 1203 as a whole constitute a code converter for converting the binary code to the gray code. The accumulation loop 1204, 1205 and 1206 serves as a relative phase-to-absolute phase converter.

The signal modulation module 11 further includes a real axis converter 1207 and an imaginary axis converter 1208 and multipliers 1209 and 1210. The 4-bit data code representative of the absolute phase is supplied to the real axis converter 1207 and the imaginary axis converter 1208. The real axis converter 1207 calculates an in-phase component, and outputs a data code representative of the in-phase component. On the other hand, the imaginary axis converter 1208 calculates a quadrature-phase component, and outputs a data code representative of the quadrature-phase component. The data codes are supplied from the real axis converter 1207 and the imaginary axis converter 1208 to the multipliers 1209 and 1210, respectively.

The signal modulation module 12 further includes a cosine wave component generator 1211, a sine wave component generator 1212, a multiplier 1213, a clock circuit 1214 and an adder 1215. The clock circuit 1214 generates a time signal representative of the elapsed time t from the sampling timing. In other words, the elapsed time is reset at time intervals each equal to the sampling period. The time signal is supplied from the clock circuit 1214 to the multiplier 1213. A reference signal is representative of $2\pi$ fc where fc is the frequency of the carrier signal, and is supplied from a signal source (not shown) to the multiplier 1213. The multiplier 1213 multiplies the value of the reference signal $2\pi$ fc by the elapsed time t, and generates a reference phase signal $2\pi$ fct. The reference phase signal $2\pi$ fct is supplied from the multiplier 1213 to the cosine wave component generator 1211 and the sine wave component generator 1212. The cosine wave component generator 1211 generates a cosine wave component signal representative of the cosine wave component of the carrier signal with unit amplitude, and the sine wave component generator 1212 generates a sine wave component signal representative of the sine wave component of the carrier signal with unit amplitude. The cosine wave component signal is supplied from the cosine wave component generator 1211 to the multiplier 1209, and the in-phase component is multiplied by the cosine wave component in the multiplier 1209. On the other hand, the sine wave component signal is supplied from the sine wave component generator 1212 to the multiplier 1210, and the quadrature-phase component is multiplied by the sine wave component. The multiplier 1209 outputs a product signal, and the product signal is supplied to the first input port of the adder 1215. On the other hand, the multiplier 1210 outputs a product signal, which is supplied to the second input port of the adder 1215. The product signals are added to each other in the adder 1215, and the analog audio signal AD1 is supplied from the adder 1215 to an output port 1216 of the signal modulation module 11. The real axis converter 1207, the imaginary axis converter 1208, the multipliers 1209, 1210, the cosine wave component generator 1211, the sine wave component generator 1212, the clock circuit 1214, the multiplier 1213 and the adder 1215 as a whole constitute a quadrature modulation circuit. Thus, the signal modulation module 12 is broken down into the code converter 1202/1203, the relative phase-to-absolute phase converter 1204/1205/1206 and the quadrature modulation circuit 1207/1208/1209/1210/1211/1212/1213/1214/1215.

Sound Reproducer

Turning back to FIG. 1 of the drawings, the sound reproducer 30 includes the detector 100 and the demodulator 30A as described hereinbefore. The detector 100 and the demodulator 30A are hereinbelow described in detail.

Detector

Figure 14:
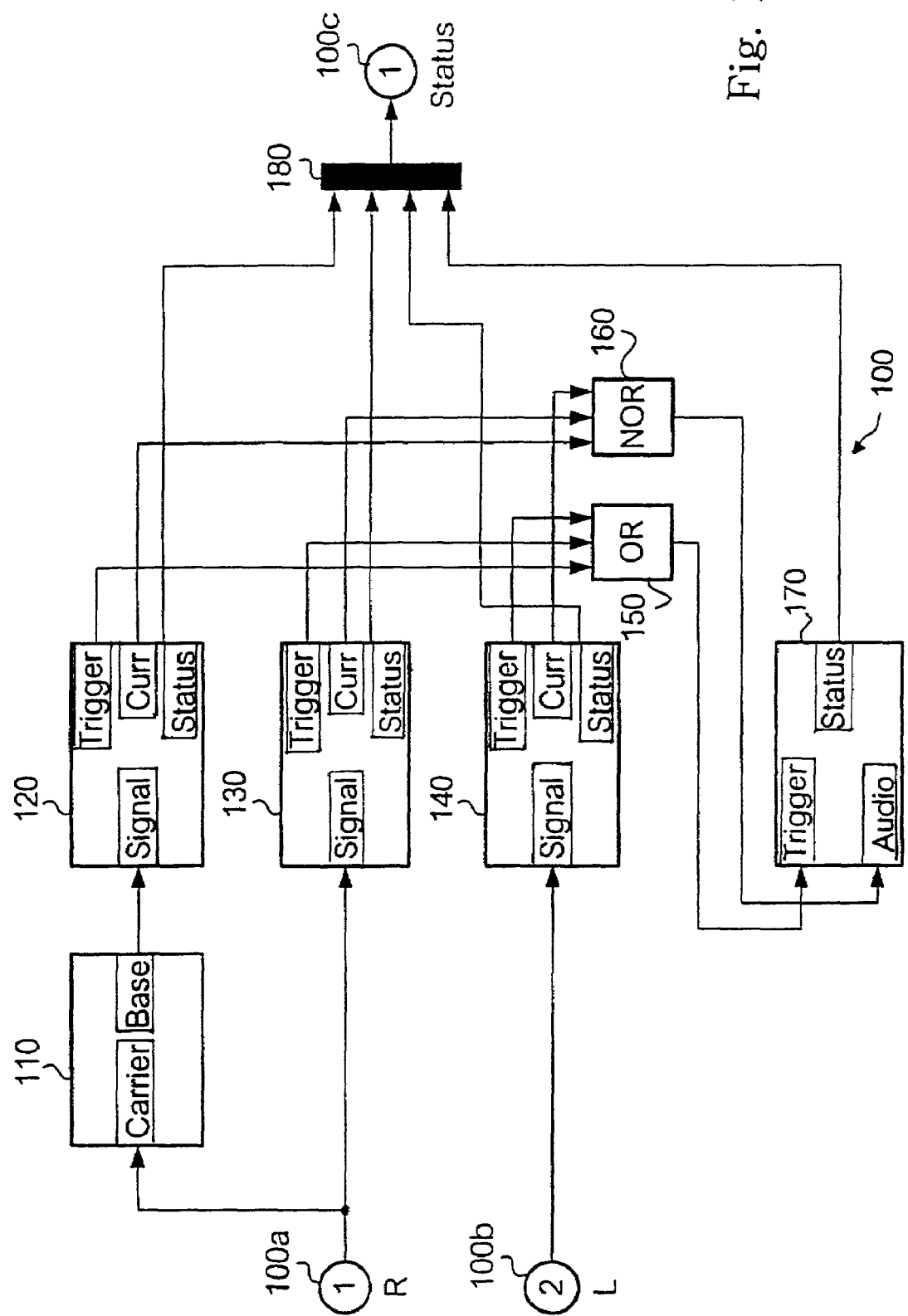
FIG. 14 is a block diagram showing the circuit configuration of a detector incorporated in a sound reproducer.

FIG. 14 shows the circuit configuration of the detector 100. The regenerative signal RG1 is supplied to signal input ports 100a and 100b. The signal input port 100 is assigned to the right channel R, and the other signal input port 100 is assigned to the left channel L. Thus, the regenerative signal is selectively supplied to the signal input ports 100a and 100b.

The detector 100 includes a demodulator 110, three detectors 120/130/140/170, logic circuits 150/160 and a status signal generator 180. The demodulator 110 is connected at an input port Carrier to the signal input port 100a, and tries to reproduce a base-band signal from the regenerative signal RG1. If the regenerative signal RG1 contains the pieces of MIDI music data information modulated through the 16 DPSK, the base-band signal is to be produced from the regenerative signal RG1. However, if not, any base-band signal is not produced from the regenerative signal RG1. The demodulator 110 supplies an output signal, i.e. either base-band or non-base-band signal from an output port Base to an input port Signal of the detector 120.

Although the detector 120 is supplied with the output signal from the demodulator 110, the regenerative signal RG1 assigned the right channel is directly supplied from the signal input port 100a to an input port Signal of the detector 130, and the regenerative signal RG1 assigned the left channel is supplied from the other signal input port 100b to an input port Signal of the detector 140. The detector 120 checks the output signal to see whether or not the regenerative signal RG1 was modulated through a modulating technique categorized in the Y-modulation. The detector 120 firstly investigates the waveform of the base-band/non-base-band signal. If the base-band/non-base-band signal exhibits a certain waveform, the detector 120 changes a signal at an output port Trigger to logic "1" level. Subsequently, the detector 120 checks the waveform to see whether or not the period is approximately equal to 317.5×n $\mu$s. When the waveform is varied at intervals of 317.5×n $\mu$s, the detector 120 changes a signal at an output port Curr to logic "1" level. If the positive answer is repeated a predetermined times, the detector 120 admits the regenerative signal RG1 to be modulated through the modulation technique categorized in the Y-modulation, and changes a signal at an output port Status to logic "1" level. When the detector 120 does not admit the regenerative signal RG1 assigned the right channel to be modulated through the modulation technique categorized in the Y-modulation, the detector 120 keeps the signal in logic "0" level, and the signal indicates that the regenerative signal RG1 assigned the right channel was not modulated through the Y-modulation technique.

The detector 130 checks the regenerative signal RG1 to see whether or not a modulation technique categorized in the P-modulation was employed to produce it. First, the detector 130 investigates the waveform of the regenerative signal RG1 assigned the right channel. If the regenerative signal RG1 is varied along a certain waveform, the detector 130 changes a signal at an output port Trigger to logic "1" level. Subsequently, the detector 130 investigates the period of the regenerative signal RG1. When the regenerative signal RG1 is varied at time intervals approximately equal to 259 $\mu$s or 129.5 $\mu$s, the detector 130 changes a signal at an output port Curr to logic "1" level. Finally, the detector 130 counts the positive answer. If the regenerative signal RG1 exhibits the period of either 259 or 129.5 $\mu$s a predetermined times, the detector 130 admits the regenerative signal RG1 to be modulated through the modulation technique categorized in the P-modulation, and changes a signal at an output port Status to logic "1" level. When the detector 130 does not admit the regenerative signal RG1 assigned the right channel to be modulated through the P-modulation technique, the detector 130 keeps the signal in logic "0" level, and the signal indicates that the regenerative signal RG1 assigned the right channel was not modulated through the P-modulation technique.

The detector 140 checks the regenerative signal RG1 assigned the left channel to see whether or not a modulation technique categorized in the Q-modulation was employed to produce it. First, the detector 140 investigates the waveform of the regenerative signal RG1 assigned the left channel. If the regenerative signal RG1 is varied along a certain waveform, the detector 140 changes a signal at an output port Trigger to logic "1" level. Subsequently, the detector 140 investigates the period of the regenerative signal RG1. When the regenerative signal RG1 is varied at time intervals approximately equal to 145 $\mu$s, 290 $\mu$s, 581 $\mu$s or 3855 $\mu$s, the detector 140 changes a signal at an output port Curr to logic "1" level. Finally, the detector 140 counts the positive answer. If the regenerative signal RG1 exhibits the period of either 145 $\mu$s, 290 $\mu$s, 581 $\mu$s or 3855 $\mu$s a predetermined times, the detector 140 admits the regenerative signal RG1 to be modulated through the modulation technique categorized in the Q-modulation, and changes a signal at an output port Status to logic "1" level. When the detector 140 does not admit the regenerative signal RG1 assigned the right channel to be modulated through the Q-modulation technique, the detector 140 keeps the signal in logic "0" level, and the signal indicates that the regenerative signal RG1 assigned the right channel was not modulated through the Q-modulation technique.

The three detectors 120, 130 and 140 are connected through the output ports Trigger to three input nodes of the logic gate 150. The logic gate 150 carries out OR operation. When at least one of the detectors 120, 130 and 140 notices the base-band/regenerative signal varying the potential level along the certain waveform, the logic circuit 150 changes the output signal to logic "1" level, and supplies the output signal to an input port Trigger of the detector 170. The three detectors 120, 130 and 140 are further connected through the signal ports Curr to three input nodes of the logic circuit 160. The logic circuit 160 carries out the NOR operation. When neither base-band signal nor regenerative signal RG1 has the predetermined period, the logic circuit 160 changes the output signal to logic "1" level, and supplies the output signal to an input port Audio of the detector 170. In other words, when the detectors 120, 130 and 140 do not admit the regenerative signal RG1 assigned both right and left channels not to be produced through any one of the Y-modulation technique, P-modulation technique and Q-modulation technique, the logic circuit 160 supplies the output signal of logic "1" level representative of a signal not containing any MIDI music data words to the input port Audio of the detector 170.

The detector 170 changes a signal at an output port Status to logic "1" level in the concurrent presence of the signals of logic "1" level at the input ports Trigger and Audio. The output signal of logic "1" level at the port Status is representative of the regenerative signal RG1 not containing any MIDI data word. In other words, the detector 170 changes the signal to logic "1" level on the following conditions. The first condition is that the base-band signal or the regenerative signal RG1 assigned either right or left channel changes the potential level along the certain waveform, i.e., at least one of the detectors 120, 130 or 140 changes the signal at the output port Trigger to logic "1" level. The second condition is that the regenerative signal RG1 assigned the right and left channels was not modulated through any one of the Y-modulation technique, P-modulation technique and Q-modulation technique, i.e., all the detectors 120, 130 and 140 have not admitted the regenerative signal RG1 assigned both right and left channels to be produced through the modulation techniques for the time period.

Though not show in FIG. 14, the signal input ports 100a/100b are further connected to a detector, which detects the regenerative signal RG1 representing silence. When the silent status is continued for a predetermined time, the detector resets the detectors 120, 130, 140 and 170. Then, the detectors 120, 130, 140 and 170 change the signals at the output ports Curr and the signals at the output ports Status to the logic "0" level.

The detectors 120, 130, 140 and 170 supply the signals from the output ports Status to the status signal generator 180. The status signal generator 180 produces the status signal S1 from the four signals, and supplies the status signal S1 to the demodulator 30A.

Demodulator

Figure 15:
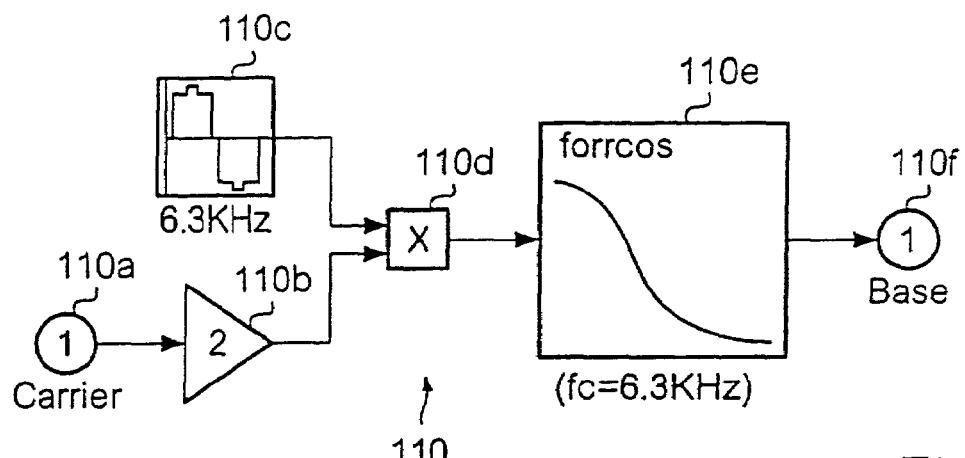
FIG. 15 is a block diagram showing the circuit configuration of a zero-crossing detector incorporated in the detector.

FIG. 15 shows the circuit configuration of the demodulator 110. The demodulator 110 includes the signal input port 110a, an amplifier 110b, a sine wave generator 110c, a multiplier 100d, a low-pass filter 110e and a signal output port 110f. The regenerative signal RG1 is supplied to the signal input port 110a, and is transferred to the amplifier 110b. The regenerative signal RG1 is increased in magnitude by the amplifier 110b, and the amplified signal is supplied to the first input port of the multiplier 110d. The sine wave generator 110c produces a sine wave signal, and supplies the sine wave signal to the second input port of the multiplier 110d. The sine wave signal is equal in frequency to the carrier signal. In this instance, the carrier frequency is 6.3 kHz, and, accordingly, the sine wave signal is produced at 6.3 kHz. The amplified signal is multiplied with the sine wave signal, and the multiplier 110b produces an output signal representative of the product, and supplies the out-put signal to the low-pass filter 110e. The low-pass filter 110e is implemented by $14^{th}$-order cosine roll-off filter, and fc is 6.3 kHz. The output signal of the multiplier 110d is filtered, and the base-band signal is extracted therefrom, if any.

Detector 120

Figure 16:
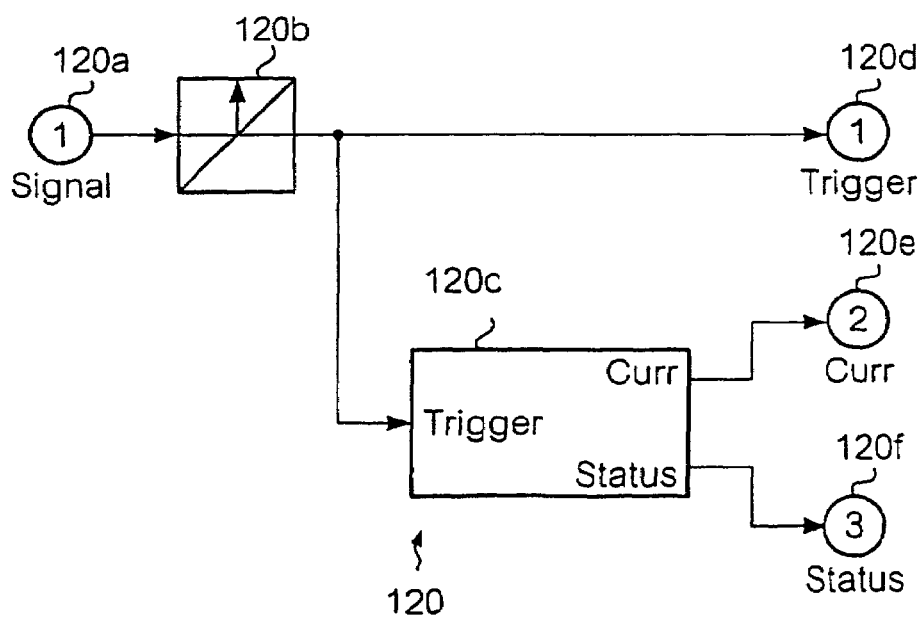
FIG. 16 is a block diagram showing the circuit configuration of a detector for discriminating features of an Y-modulation.

FIG. 16 shows the circuit configuration of the detector 120. The detector 120 has an input port 120a and output ports 120d, 120e and 120f, and a zero-crossing detector 120b and an interval discrimination circuit 120c are connected between the input port 120a and the output ports 120d/120e/120f. The zero-crossing detector 120b exhibits hysteresis characteristics. The baseband/non-base-band signal is supplied from the output port Base to the input port 120a, and is transferred to the zero-crossing detector 120b. The zero-crossing detector 120b checks the base-band/non-base-band signal to see whether or not the potential level exhibits the certain waveform at time intervals equal to the sampling period. Half-amplitude levels are determined with respect to the zero level. When the demodulator 110 changes the base-band/non-base-band signal from a positive level over the half-amplitude level to a negative level under the other half-amplitude level in the time interval, the zero-crossing detector admits the certain waveform, and produces the signal of logic "1" level at the output node thereof. On the other hand, if the baseband/non-base-band signal is not changed across the half-amplitude levels, the zero-crossing detector 120b does not admit the certain waveform, and keeps the signal in logic "0" level. The zero-crossing detector 120b supplies the signal from the output node thereof to the output port 120d and the input port Trigger of the interval discriminating circuit 120c.

The interval discriminating circuit 120c includes the first counter responsive to the sampling clock signal so as to increment the value stored therein. The value is reset to zero when the signal of logic "1" level reaches the input port Trigger thereof. While the zero-crossing detector 120b is keeping the signal in logic "0" level, the counter increments the value at the sampling timing. This means the first counter measures the period of the base-band/non-base-band signal. When the zero-crossing detector 120b changes the signal to logic "1" level, the interval discriminating circuit 120c checks the value to see whether or not the base-band/non-base-band signal is varied at the time intervals approximated to 317.5×n $\mu$s. If the answer is given affirmative, the interval discriminating circuit 120c changes the signal at the output port Curr to logic "1" level. The interval discriminating circuit 120c further has the second counter. If the signal at the output port Curr is in logic "0" level at the sampling timing, the second counter is preset to the predetermined value. On the other hand, if the signal at the output port Curr is in logic "1" level, he predetermined value is decremented. When the second counter reaches zero, the interval discriminating circuit 120c decides that the regenerative signal RG1 was modulated through the Y-modulation technique, and changes the signal at the output port Status to logic "1" level.

The sampling period is assumed to be 22.68$\mu$s. When the zero-crossing detector 120b changes the signal at the output port Trigger to logic "1" level, the interval discriminating circuit 120c divides the value stored in the first counter by 14, and checks the calculating result to see whether or not the remainder is any one of 13, 0 and 1. The remainders "13", "0" and "1" are resulted from equations (22.68 $\mu$s×(14n−1)=(317.5n−22.68) $\mu$s), (22.68 $\mu$s×14 n=317.5 $\mu$s) and (22.68 $\mu$s ×(14n+1)=(317.5n+22.68) $\mu$s) where n is a natural number. If the remainder is either 13, 0 or 1, the base-band signal has the edge-to-edge interval equivalent to 317.5×n $\mu$s.

The predetermined value is assumed to be 8. The second counter is preset to 8. When the remainder is 13, 0 or 1, the predetermined value is decremented by 1. If the division continuously results in the remainder 13, 0 or 1 eight times, the second counter reaches zero, and the interval discriminating circuit 120c decides that the regenerative signal RG1 was modulated through the Y-modulation technique.

Detectors 130/140

The detectors 130 and 140 are similar in circuit configuration to the detector 120, and the detectors 120, 130 and 140 are responsive to the sampling clock signal. The regenerative signal RG1 assigned the right channel and the left channel is directly supplied to the detectors 130 and 140. The zero-crossing detectors of the detectors 130/140 are different in detecting level from the zero-crossing detector 120b incorporated in the detector 120, and the interval discriminating circuits of the detectors 130/140 are different in criteria for the period and the preset value from the interval discriminating circuit 120c.

The sampling period is assumed to be 22.68 $\mu$s. The interval discriminating circuit of the detector 130 behaves as follows. The first counter is incremented in response to the sampling clock signal. When the signal at the port Trigger is changed to logic "1" level, the interval discriminating circuit of the detector 130 checks the first counter to see whether or not the value stored therein is equal to 5, 6, 11 or 12. If the answer is positive, the interval discriminating circuit decides that the edge-to-edge interval is equal to 129.5 $\mu$s or 259 $\mu$s, and the interval discriminator changes the signal at the port Curr to logic "1" level. The second counter is preset to 16, and the value stored in the second counter is decremented by one when the first counter outputs the signal of logic "1" level to the port Curr. When the value stored in the second counter reaches zero, the interval discriminator decides that the regenerative signal RG1 was modulated through the P-modulation technique.

The sampling period is also assumed to be 22.68 $\mu$s. The interval discriminating circuit incorporated in the detector 140 behaves as follows. The first counter is also incremented in response to the sampling clock signal. When the signal at the port Trigger is changed to logic "1" level, the interval discriminating circuit of the detector 140 checks the first counter to see whether or not the value stored therein is equal to 6, 7, 12, 13, 14, 26, 27 or 166 to 174. If the answer is positive, the interval discriminating circuit decides that the edge-to-edge interval is equal to 145 $\mu$s, 290 $\mu$s, 581 $\mu$s or 3855 $\mu$s, and the interval discriminator changes the signal at the port Curr to logic "1" level. The second counter is also preset to 16, and the value stored in the second counter is decremented by one when the first counter outputs the signal of logic "1" level to the port Curr. When the value stored in the second counter reaches zero, the interval discriminator decides that the regenerative signal RG1 was modulated through the Q-modulation technique.

Software Implementation

Figure 17A:
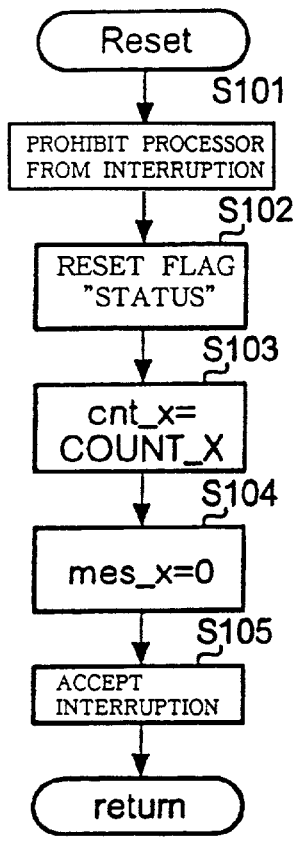
FIGS. 17A and 17B are flowcharts showing a computer program for discriminating a regenerative signal modulated through predetermined modulating techniques.
Figure 17B:
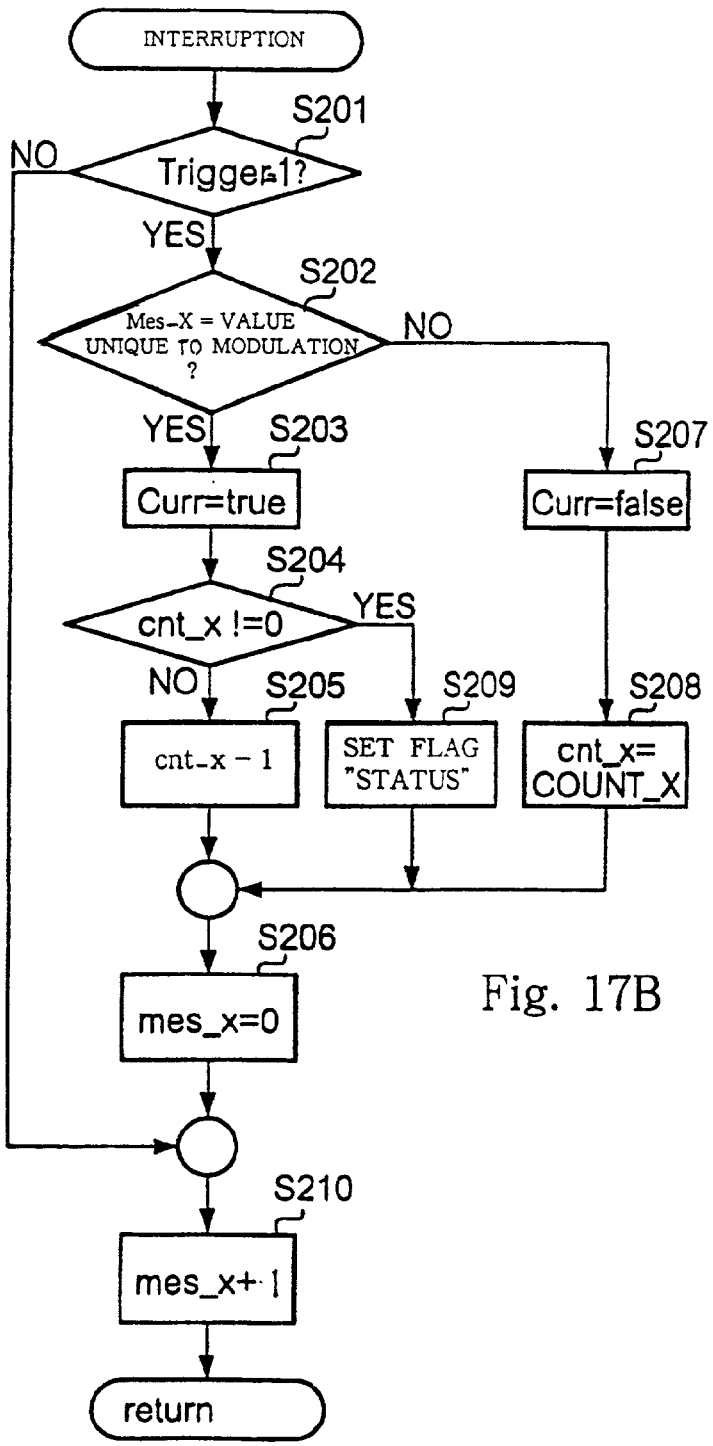

The interval discriminating circuits of the detectors 120, 130 and 140 may be implemented by software. In this instance, the detector 100 includes a microprocessor, a program memory, a working memory, an interface and a bus system connected to the other components. FIGS. 17A and 17B shows a computer program running on the microprocessor. In the flowcharts shown in FIGS. 17A and 17B and the following description, a constant and a variable are expressed as "\_X" and "\_x", which are common for the three detectors 120, 130 and 140. When focusing the description and the flowcharts on the detector 120, "\_X" and "\_x" are to be read as "\_Y" and "\_y". Similarly, when focusing the description and the flowcharts on the detector 130 or 140, "\_X" and "\_x" are to be read as "\_P" and "\_p" or "\_Q" and "q".

In the flowcharts, mes\_x and cont\_x are corresponding to the value stored in the first counter and the value stored in the second counter. Flags "Status" and "Curr" are corresponding to the ports Status and Curr, respectively.

First, an initialization is carried out as shown in FIG. 17A. The microprocessor prohibits itself from interruptions as by step S101, and the flag "Status" is reset as by step S102. Subsequently, the microprocessor makes the variable cnt\_x equal to constant\_X as by step S103, and changes the variable mes\_x to zero as by step S104. Finally, the microprocessor allows itself to accept the interruption as by step S105.

After the interruption is allowed. The microprocessor repeats the program sequence shown in FIG. 17B at every interruption. The interruption takes place at intervals of 22.67 $\mu$s. When the interruption takes place, the microprocessor checks the interface to see whether or not the signal at the interface corresponding to the port Trigger is in logic "1" level as by step S201. If the signal still stays in logic "0" level, the microprocessor proceeds to step S210, and the variable mes\_x is incremented by one.

On the other hand, when the microprocessor finds the signal to be in logic "1" level, the microprocessor checks the variable mes\_x to see whether or not the variable is equal to any one of the values unique to the given modulation technique, i.e., the Y-modulating technique, the P-modulating technique or the Q-modulating technique as by step S202. The values unique to the Y-modulating technique are equivalent to the remainders "13", "0" and "1".

If the variable mes_x is different from the values unique to the given modulation technique, the microprocessor keeps the flag Curr zero representative of false as by step S207, and makes the variable cnt_x equal to the constant COUNT_X as by step S208. Thereafter, the microprocessor resets the variable mes_x to zero as by step S206, and adds one to the variable mes_x at step S210.

On the other hand, when the variable mes_x is equal to any one of the values unique to the given modulating technique, the answer at step S202 is given affirmative, and the microprocessor changes the flag Curr to "1" representative of true as by step S203. The microprocessor checks the variable cnt_x to see whether or not the variable has reached zero as by step S204. If the unique values have been repeated, the microprocessor admits the regenerative signal was modulated through the given modulating technique, and the answer at step S204 is given affirmative. Then, the microprocessor raises the flag "Status" as by step S209. On the other hand, if the unique values have not been repeated the predetermined times equal to the constant COUNT_X, the answer at step S204 is given negative, and the microprocessor decrements the variable cnt_x by one as by step S205.

Upon completion of the job at either S205 or S209, the microprocessor changes the variable mes_x to zero at step S206, and increments the variable mes_x by one at step S210.

Figure 18A:
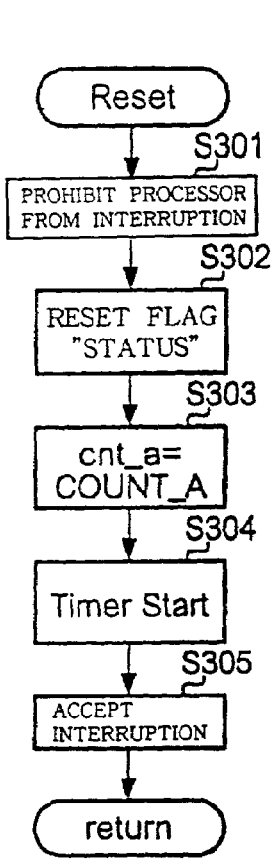
FIGS. 18A and 18B are flowcharts showing a computer program for discriminating the regenerative signal not modulated through the predetermined modulating techniques.
Figure 18B:
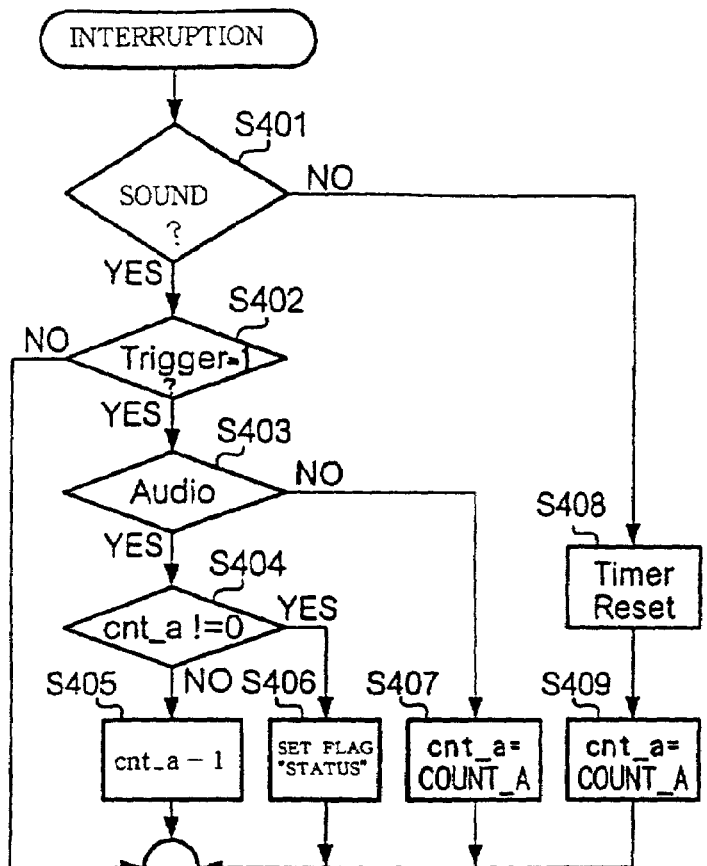

The detector 170 may be also implemented by software. FIGS. 18A and 18B show a computer program realizing the function of the detector 170. Variable cnt_a is indicative of the number of interruptions. The interruption takes place at intervals of 22.67 $\mu$s. A timer is implemented by a counter. The timer automatically increments the value stored therein, and the unit time is equal to 22.67 $\mu$s.

First, the microprocessor carries out an initialization as shown in FIG. 18A. The microprocessor prohibits itself from the interruption as by step S301. Subsequently, the microprocessor resets the flag "Status" as by step S302, and makes the variable cnt_a equal to a constant COUNT_A such as, for example, 32 as by step S303. The microprocessor starts the timer as by step S304, and the timer automatically increments the lapse of time. Finally, the microprocessor allows itself to accept the interruptions as by step S305.

The interruption takes place at intervals of 22.67 $\mu$s. When the interruption takes place, the microprocessor checks the interface corresponding to the input ports 100a/100b to see whether or not the regenerative signal RG1 represents sound as by step S401. If the microprocessor finds the regenerative signal to be representative of silence, the answer at step S401 is given negative, and the microprocessor resets the timer as by step S408, and makes the variable cnt_a equal to the constant COUNT_A as by step S409. The microprocessor checks the timer to see whether or not the value has been incremented for a predetermined time period as by step S410. The timer may be expected to increment the value by 4000. Since the timer was reset at step S408, the answer at step S410 is given negative, and the microprocessor exits from the routine shown in FIG. 18B.

On the other hand, when the regenerative signal RG1 is representative of sound, the answer at step S401 is given affirmative, and the microprocessor checks the interface corresponding to the port "Trigger", i.e., the output signal of the logic gate 150 to see whether or not the signal is in logic "1" level as by step S402. If the answer at step S402 is given negative, the microprocessor proceeds to step S410, and checks the timer to see whether or not the value has been incremented for the predetermined time at step S410. If the answer at step S410 is given affirmative, the microprocessor sets the flag "Status" as by step S411. The microprocessor stops the timer and resets it as by step S412.

On the other hand, If the answer at step S402 is given affirmative, the microprocessor checks the interface corresponding to the port "Audio", i.e., the output signal of the logic gate 160 to see whether or not the signal is in logic "1" level as by step S403. If the answer at step S403 is given negative, the microprocessor makes the variable cnt_a equal to constant COUNT_A as by step S407, and proceeds to step S410.

On the contrary, if the answer at step S402 is given affirmative, the microprocessor checks the variable cnt_a to see whether or not the variable reaches zero as by step S404. If the variable cnt_a has already reached zero, the answer at step S404 is given affirmative, and the microprocessor sets the flag "Status". On the other hand, if the answer at step S404, the microprocessor decrements the variable cnt_a by one, and proceeds to step S410.

Demodulator 30A

Turning back to FIG. 1 of the drawings, the functions of the demodulator 30A are equivalent to a signal demodulating module 31 and a data converting module 32. In other words, FIG. 1 shows a hardware implementation of the demodulator 30A. The sound recorder 10 is assumed to employ a modulation technology categorized in the Y-modulation to produce the analog audio signal AD1. The detector 100 supplies the status signal representative of the Y-modulation technique to the demodulator 30A. The demodulating module 31 reproduces a nibble stream DS2 from the regenerative signal RG1 by using a demodulating technique corresponding to the Y-modulating technique, and supplies the nibble stream DS2 to the data converting module 32. The nibble stream DS2 is equivalent to the nibble stream DS1. The data converting module 32 eliminates the synchronous nibbles from the nibble stream DS2, and reproduces the MIDI data words. The MIDI data words are supplied to the tone generator (not shown), and the analog audio signal is produced from the MIDI data words.

Signal Demodulating Module

Figure 19:
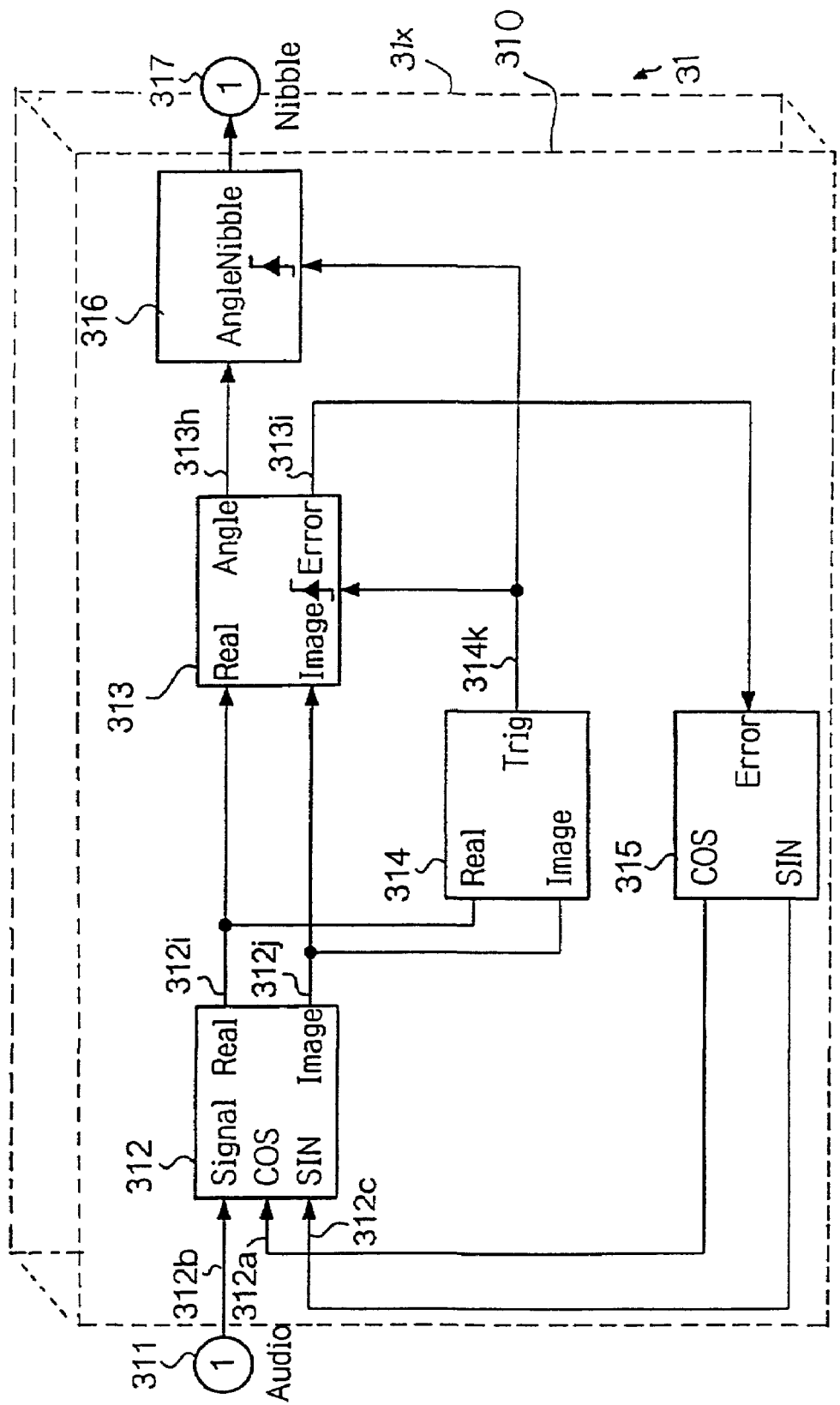
FIG. 19 is a block diagram showing the circuit configuration of a signal demodulating module incorporated in the sound reproducer.

FIG. 19 shows the circuit configuration of the signal demodulating module 31. The signal modulating module 31 has plural function planes 310 to 31x. The plural functional planes 310 to 31x are assigned to demodulation techniques different from one another. In this instance, the functional plane 310 is assigned to the demodulation technique corresponding to the Y-modulation technique using the 16 DPSK. Another functional plane is assigned to a demodulation technique corresponding to the P-modulation technique, and yet another functional plane is assigned to a demodulation technique corresponding to the Q-modulation technique. The signal demodulation module 31 is responsive to the status signal S1 for selectively activating the plural function planes 310 to 31x. The status signal S1 is assumed to represent the 16 DPSk. The function plane 310 is activated. The function plane 310 is described hereinbelow in detail.

The function plane 310 includes a synchronous detector 312, a coordinate transformation circuit 313, a trigger signal generator 314, a phase-locked loop 315 and a reverse mapping circuit 316. The regenerative signal RG1 is supplied from an input port 311 to a signal input terminal 312b of the synchronous detector 312. The phase locked loop 315 supplies a cosine wave component signal representative of the cosine wave component of an oscillation signal and a sine wave component signal representative of the sine wave component of the oscillation signal to signal input terminals 312a and 312c, respectively. The cosine wave component and the sine wave component are representative of a waveform corresponding to the carrier signal, and the phase locked loop 315 controls the frequency of the oscillation signal so as to match the phase of the waveform with the phase of the carrier signal. The synchronous detector 312 extracts a series of momentary points from the regenerative signal RG1, and determines a real part of each momentary point and an imaginary part of the momentary point. The synchronous detector 312 outputs an output signal representative of the real part and another output signal representative of the imaginary part from signal output terminals 312i and 312j, respectively. The real part and the imaginary part are indicative of the momentary point of the regenerative signal RG1 in the quadrature coordinate system, and, accordingly, are the coordinates in the quadrature coordinate system. The output signal representative of the real part and the output signal representative of the imaginary part are supplied from the signal output terminals 312i and 312j to both of the coordinate transformation circuit 313 and the trigger signal generator 314.

The trigger signal generator 314 is responsive to the output signals of the synchronous detector 312 for generating a trigger signal indicative of a synchronous timing. The trigger signal is supplied from the signal output terminal 314k to the coordinate transformation circuit 313. The coordinate transformation circuit 313 is responsive to the trigger signal for convert the coordinates in the quadrature coordinate system to corresponding coordinates in a polar coordinate system. One of the coordinates is indicative of the angle between zero to 2π in the polar coordinate system. The coordinate transformation circuit 313 produces an output signal representative of the angle, and supplies the output signal from the signal output terminal 313h to the reverse mapping circuit 316. The angle of the momentary point may be different from one of the sixteen angular positions (see FIG. 12). The coordinate transformation circuit 313 further determines an error component introduced in the angle through a frequency multiplication technique, and produces another output signal representative of the error component. The coordinate transformation circuit 313 supplies the output signal representative of the error component from another signal output terminal 313i to a control terminal of the phase locked loop 315. The phase locked loop 315 is responsive to the output signal representative of the error component so as to correct the phase of the waveform.

The reverse mapping circuit 316 is responsive to the trigger signal so as to convert the approximate angle to a 4-bit data nibble corresponding to the 4-bit gray code at the approximate angle. Thus, the function plane 310 restores the carrier signal on the basis of the regenerative signal RG1, and reproduces the series of data nibbles also from the regenerative signal RG1 through the coordinate transformation from the quadrature coordinate system to the polar coordinate system and through the data conversion from the approximate angle to the data nibble. In this instance, the signal demodulation module 31 is broken down into a carrier restoring circuit 312/313/315, a data converter 312/313/314 for converting the quadrature data to the angular data and another data converter 316 for converting the angular data to the data nibble.

Figure 20:
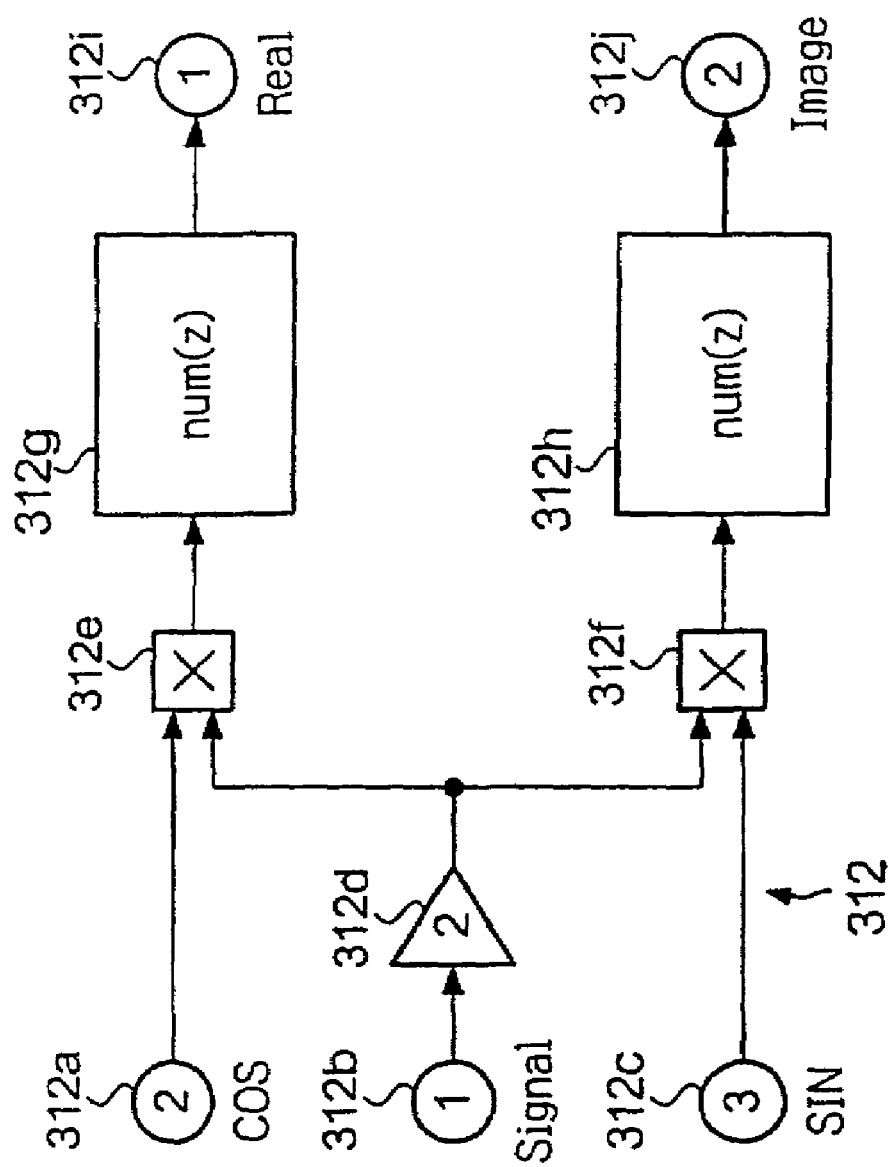
FIG. 20 is a block diagram showing the circuit configuration of a synchronous detector incorporated in the signal demodulation circuit.

FIG. 20 shows the circuit configuration of the synchronous detector 312. The synchronous detector 312 has the three signal input terminals 312a/312b/312c and the two signal output terminals 312i/312j, and an amplifier 312d, multipliers 312e/312f and cosine roll-off filters 312g/312h are connected between the signal input terminals 312a/312b/312c and the signal output terminals 312i/312j. The cosine roll-off filter 312g is provided for the real part (R), and the other cosine roll-off filter 312h is provided for the imaginary part (I). The regenerative signal RG1 is supplied from the signal input terminal 312b through the amplifier 312d to both of the multipliers 312e/312f. The cosine wave component signal is supplied from the signal input terminal 312a to the multiplier 312e, and the multiplier 312e carries out the multiplication between the value of the regenerative signal RG1 and the value of the cosine wave component signal for producing an output signal representative of the product. On the other hand, the sine wave component signal is supplied form the signal input terminal 312c to the multiplier 12f, and the multiplier 312f carries out the multiplication between the value of the regenerative signal RG1 and the value of the sine wave component signal for producing an output signal representative of the product.

The output signal is supplied from the multiplier 312e to the cosine roll-off filter 312g, and the other output signal is supplied from the multiplier 312f to the other cosine roll-off filter 312h. The cosine roll-off filters 312g/312h have the roll-off ratio α of 1.0. The cosine roll-off filters 312g/12h restrict the frequency of the base band, and extracts the real part and the imaginary part. The cosine roll-off filters 312g/312h produces the output signal representative of the real part and the output signal representative of the imaginary part, and supplies the output signals to the signal output terminals 312i/312j, respectively.

FIG. 21 shows the circuit configuration of the coordinate transformation circuit 313. The coordinate transformation circuit 313 has the signal input terminals 313a/313b respectively assigned to the output signals of the synchronous detector 312 and the signal output terminals 313h/313i assigned to the output signal representative of the angle and the output signal representative of the error component. A coordinate transformer 313c, a multiplication/division circuit 313d, a modulo function circuit 313e, a source 313f of constant and an addition/subtraction circuit 313g are connected between the signal input terminals 313a/313b and the signal output terminals 313h/313i.

The real part and the imaginary part are the coordinates assigned to a point in the quadrature coordinate system, and the coordinate transformer 313c is responsive to the trigger signal so as to convert the coordinates in the quadrature coordinate system to the corresponding coordinates in the polar coordinate system. One of the coordinates in the polar coordinate system is representative of the angle of the momentary point, and the coordinate transformer 313c supplies the output signal representative of the angle to the signal output terminal 313h.

The output signal representative of the angle is further supplied to the multiplication/division circuit 313d, and the angle is multiplied by 16/2π. The product ranges from zero to sixteen. The multiplication/division circuit 313d produces an output signal representative of the product, and supplies the output signal to the modulo function circuit 313e. The product usually consists of an integer and a decimal. The modulo function circuit 313e produces an output signal representative of the decimal, and supplies the output signal to the addition/subtraction circuit 313g. The source of constant 313f supplies an output signal representative of 0.5 to the addition/subtraction circuit 313g, and 0.5 is subtracted from the decimal. The addition/subtraction circuit 313g produces an output signal representative of the difference, and supplies the output signal to the signal output terminal 313i. Thus, the phase is multiplied by sixteen, and the piece of symbol information is degenerated through the modulo function unit 313e for extracting the error. This data processing is known as the frequency multiplication technique.

Figure 22:
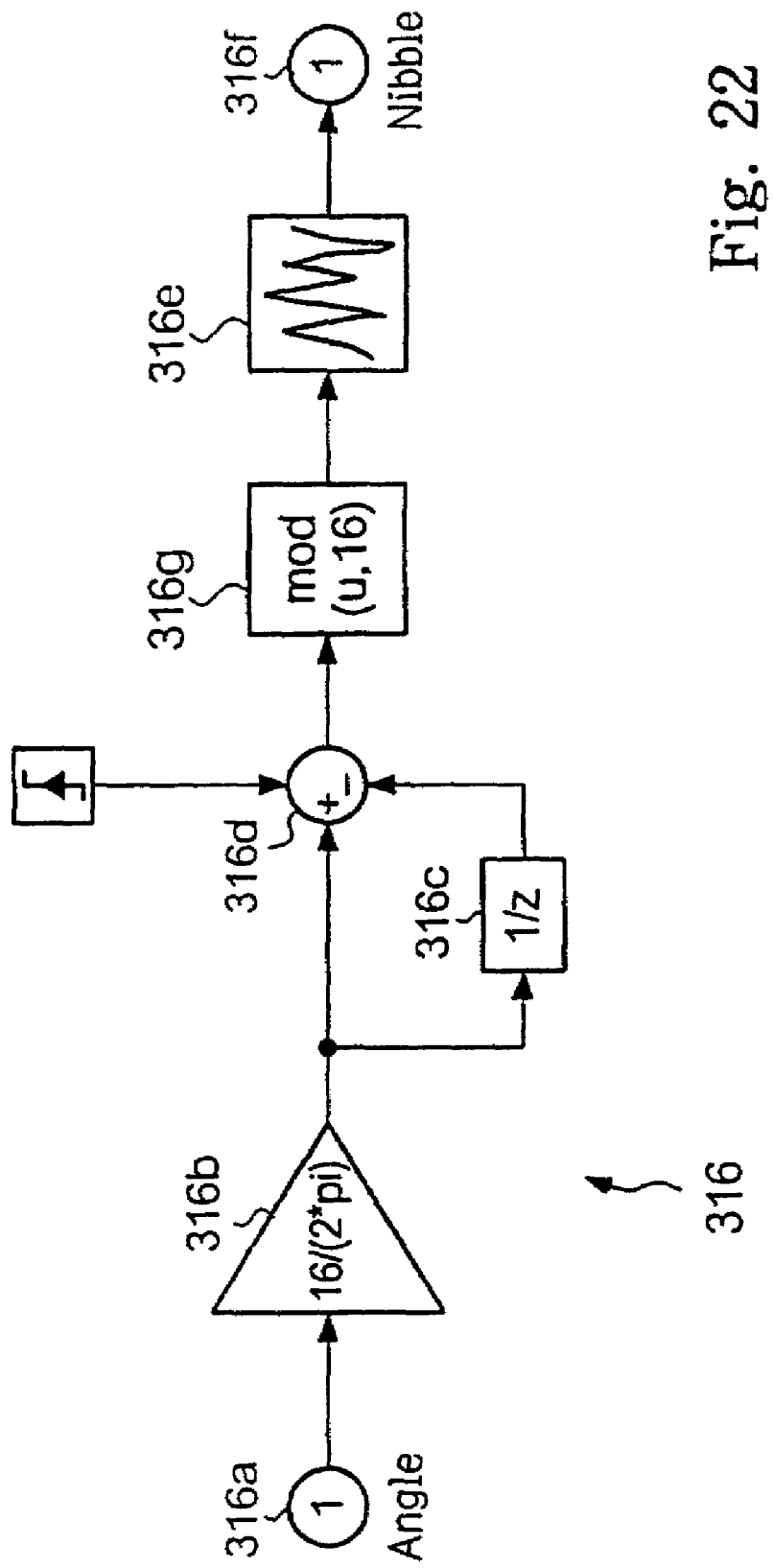
FIG. 22 is a block diagram showing the circuit configuration of a reverse mapping circuit incorporated in the signal demodulation circuit.

FIG. 22 shows the reverse mapping circuit 316. The reverse mapping circuit 316 has the signal input terminal 316a and the signal output terminal 316f, and a multiplication/division circuit 316b, a delay circuit 316c, an addition/subtraction circuit 316d, a modulo function circuit 316g and a data converter 316e are connected between the signal input terminal 316a and the signal output terminal 316f. The output signal representative of the angle is supplied from the signal input terminal 316a to the multiplication/division circuit 316b, and the angle is multiplied by $16/2\pi$. The angle ranges from zero to $2\pi$, and the product ranges from zero to sixteen. The multiplication/division circuit 316b produces an output signal representative of the product, and supplies the output signal to the delay circuit 316 and the addition/subtraction circuit 316d. The delay circuit 316c introduces a time delay into the propagation of the output signal, and the product is subtracted from the next product. This means the data conversion from the absolute phase to the relative phase. The addition/subtraction circuit 316d produces an output signal representative of the difference between the product and the next product, i.e., the relative phase, and supplies the output signal to the modulo function circuit 316g. The difference is divided by sixteen, and the modulo function circuit 316g produces an output signal representative of the remainder obtained through the division. The output signal is supplied from the modulo function circuit 316g to the data conversion circuit 316e. The gate conversion circuit 316e carries out the reverse data conversion from the gray code to the corresponding data nibble, and supplies the data nibble to the signal output terminal 316f. Thus, the signal demodulation circuit 31 restores the nibble stream DS2 on the basis of the regenerative signal RG1.

Figure 23:
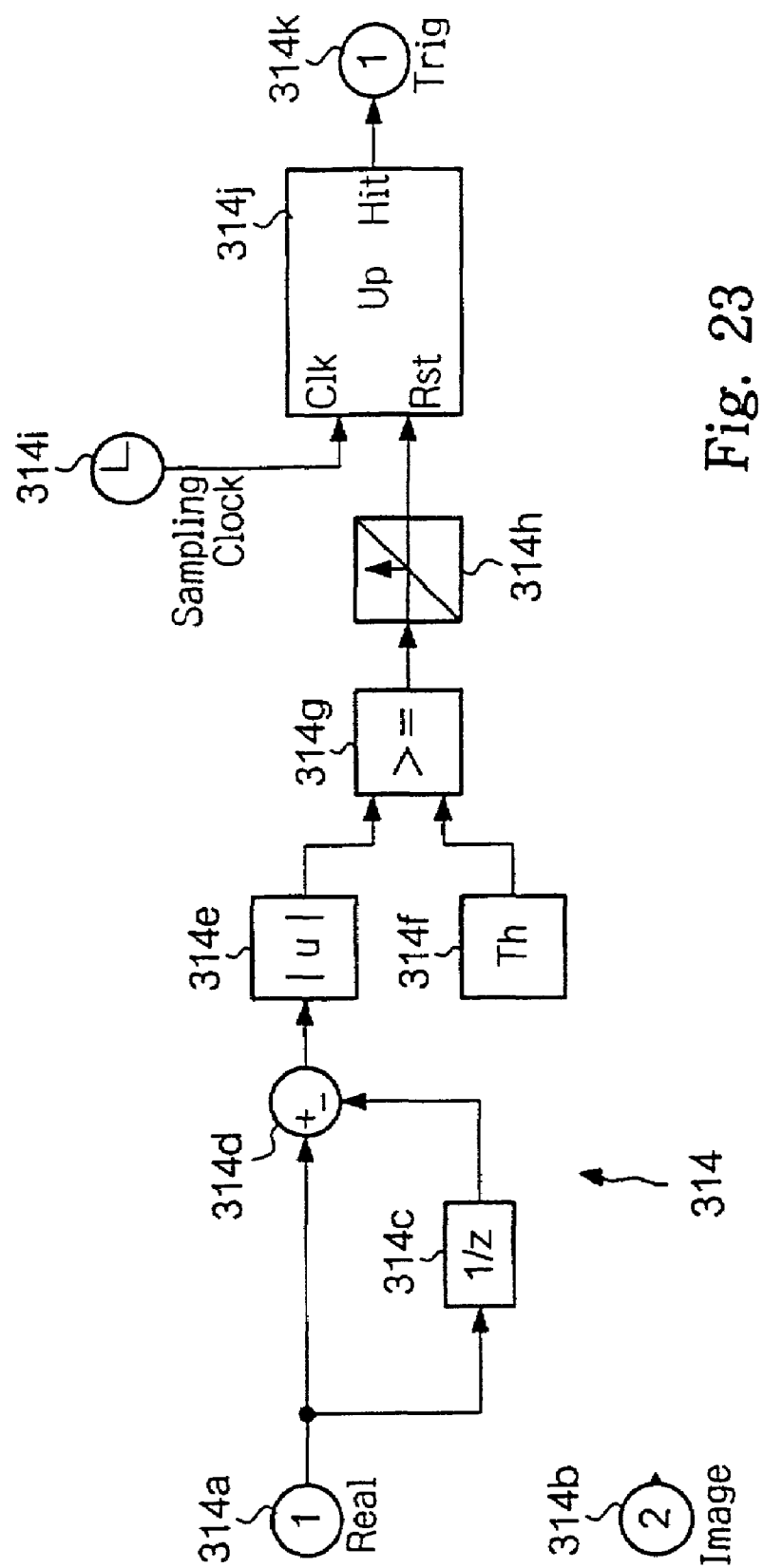
FIG. 23 is a block diagram showing the circuit configuration of a trigger signal generator incorporated in the signal demodulation circuit.

FIG. 23 shows the circuit configuration of the trigger signal generator 314. The output signals representative of the real part and the imaginary part are supplied to the signal input terminals 314a and 314b, respectively. The trigger signal generator 314 further includes a delay circuit 314c, an addition/subtraction circuit 314d, an absolutizing circuit 314e, a threshold generator 314f, a comparator 314g, an edge detector 314h, a clock generator 314i and a counter 314j.

The output signal representative of the real part is supplied to the delay circuit 314c and the addition/subtraction circuit 314d. The delay circuit 314c introduces a time delay into the propagation of the real part, and supplies the real part to the addition/subtraction circuit 314e. The real part and the next real part reach the addition/subtraction circuit 314d, and the value of the real part is subtracted from the value of the next real part. The addition/subtraction circuit 314d produces an output signal representative of the difference, and supplies the output signal to the absolutizing circuit 314e. The absolutizing circuit 314e determines the absolute value of the difference, and produces an output signal representative of the absolute value. The output signal representative of the absolute value is supplied from the absolutizing circuit 314e to the comparator 314g. The threshold generator 314f supplies an output signal representative of a threshold to the comparator 314g, and the comparator 314g compares the absolute value with the threshold to see whether the absolute value exceeds the threshold. When the absolute value exceeds the threshold, the comparator 314g raises an output signal at the output node thereof. The output signal is supplied form the comparator 314g to the edge detector 314h. The edge detector 314h monitors the output signal of the comparator 314g to see whether or not the comparator 314g raises the output signal. When the edge detector 314h detects the leading edge of the output signal, the edge detector 314h changes a reset signal to active level, and supplies the reset signal to the reset node of the counter 314j. The clock generator 314i generates a clock signal equal in frequency to the sampling clock signal, and supplies the clock signal to the clock node of the counter 314j. In this instance, the sampling clock signal is 44100 kHz, and, accordingly, the clock signal is 44100 kHz. The carrier frequency is 6300 Hz. The sampling clock frequency is seven times larger than the carrier frequency. The up-counter 314i increments the count from zero to six, and returns to zero. Thus, the counter 314i reiterates the loop between zero to six. After the counter 314j is reset with the reset signal, the counter 314j increments the count stored therein. When the count reaches a predetermined value at the intermediate point in the loop, the counter 314j changes the trigger signal to the active level, and the trigger signal is supplied to the coordinate transforming circuit 313 and the reverse mapping circuit 316.

Figure 24:
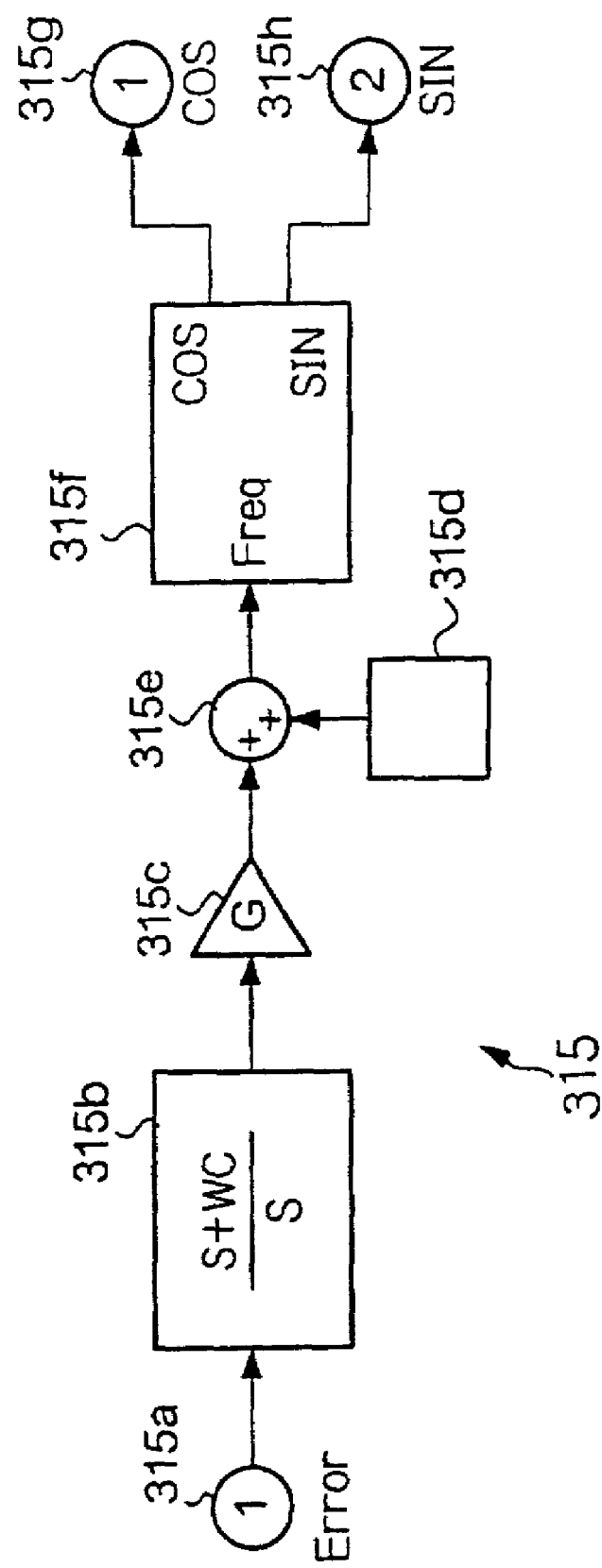
FIG. 24 is a block diagram showing the circuit configuration of a phase-locked loop incorporated in the signal demodulation circuit.

FIG. 24 shows the circuit configuration of the phase-locked loop 315. The phase locked loop 315 includes a loop filter 315b, a loop gain amplifier 315c, a source of constant 315d, an adder 315e and a voltage-controlled oscillator 315f. The source of constant 315d produces an output signal representative of a value corresponding to the carrier frequency of 6300 Hz. The output pulse signal representative of the error component is supplied from the signal input terminal 315a to the loop filter 315b. The loop filter 315b is implemented by a low boost filter, which has a predetermined cut-off angular frequency $\omega c$. The output pulse signal is filtered by the loop filter 315b. The frequency components equal to or greater than the cut-off angular frequency $\omega c$ are output at gain equal to 1, and the frequency components less than the cut-off angular frequency $\omega c$ are output at gain greater than 1. The output signal of the loop filter 315b is amplified by the loop gain amplifier 315c, and the value of the output signal is added to the contact value corresponding to the carrier frequency of 6300 Hz by the adder 315e. The adder 315e produces an output signal representative of the sum, and supplies the output signal to the control node of the voltage-controlled oscillator 315f. The voltage-controlled oscillator 315f is responsive to the potential level at the control node Freq, and produces the oscillation signal at a frequency corresponding to the potential at the control node. The cosine wave component and the sine wave component are extracted from the oscillation signal, and produce the output signal representative of the cosine wave component and the output signal representative of the sine wave component. The voltage-controlled oscillator 315f supplies the output signals to the synchronous detector 312.

Data Converting Module

Figure 25:
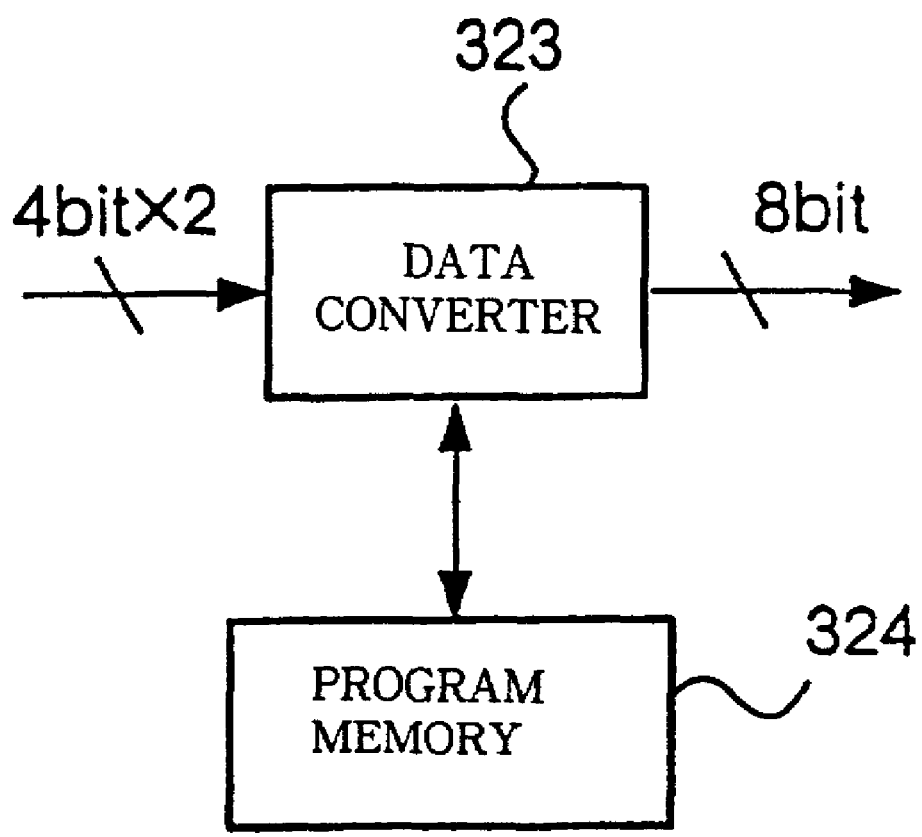
FIG. 25 is a block diagram showing the circuit configuration of a data converting module incorporated in the sound reproducer.

On the other hand, the data converting module 32 is equivalent to a data converter 323 accompanied with a program memory 324 as shown in FIG. 25. The data converter 323 is implemented by a data processor, and the data processor runs on a computer program stored in the program memory 324 for restoring the MIDI data words. The data converter 323 checks the nibble stream DS2 to see whether or not any one of the nibbles is identical in bit string with the synchronous nibble. If the nibble is identical in bit string with the synchronous data nibble, the data converter 323 ignores the nibble, and, accordingly, the synchronous data nibble or nibbles are eliminated from the nibble stream DS2. The data converter 323 further checks the nibble stream DS2 to see whether or not any one of the nibbles is identical in bit string with the nibble forming a part of the quasi MIDI status code. If the answer is given negative, the data converter 323 determines the number of the MIDI data bytes, and integrates the MIDI status byte with the MIDI data bytes for reproducing the MIDI music data word. On the other hand, if the answer is given affirmative, the data converter 323 replaces the nibble with an appropriate nibble so as to restore the MIDI status byte. The data converter 323 determines the number of MIDI data bytes, and integrates the MIDI status byte with the MIDI data bytes for reproducing the MIDI music data word.

Figure 26:
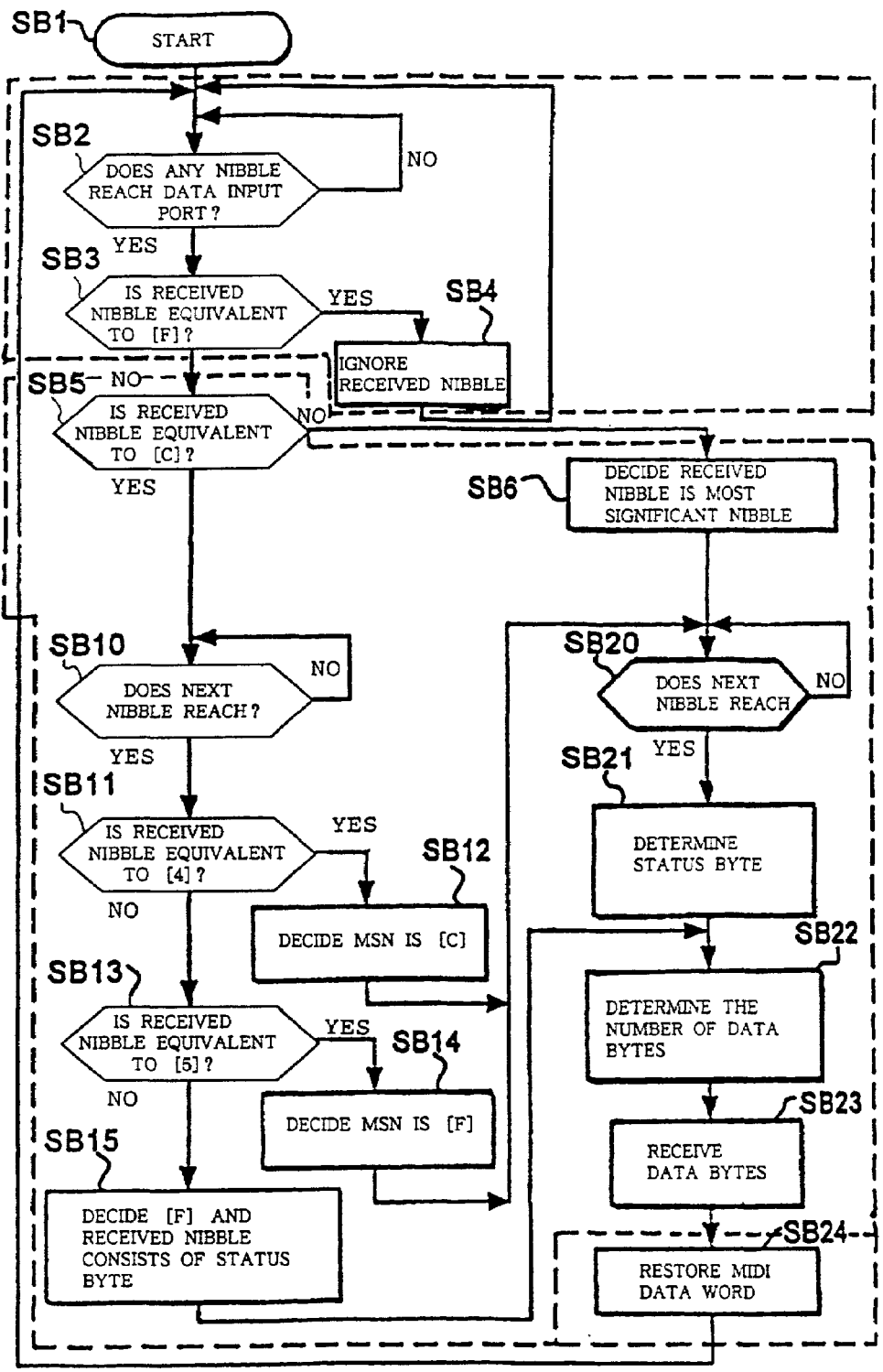
FIG. 26 is a flowchart showing a computer program executed by a data processor incorporated in the data converting module.

The jobs are detailed with reference to FIG. 26. FIG. 26 shows the computer program. The data converter 323 sequentially fetches the programmed instructions from the program memory 324. The data processor 323 takes out the quasi MIDI music data words from the nibble stream DS2 through execution of the computer program, and reproduces the MIDI music data words from the quasi MIDI music data words as described hereinbelow in detail.

Figure 27A:
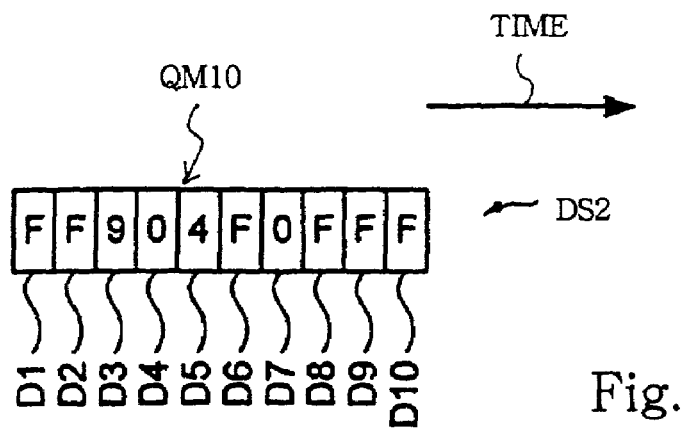
FIGS. 27A and 27B are views showing a part of a nibble stream and a MIDI data word restored therefrom.
Figure 28A:
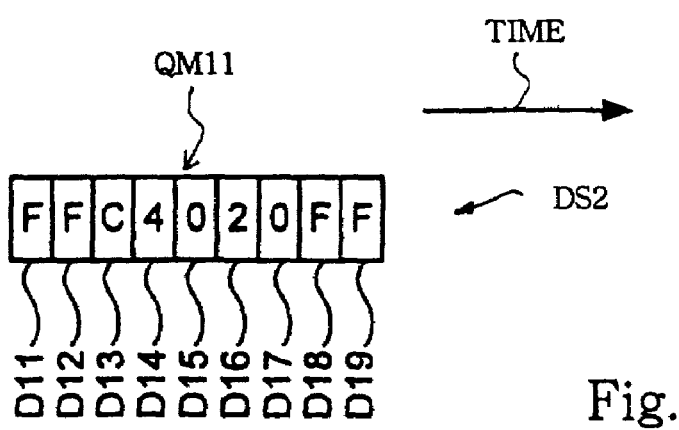
FIGS. 28A and 28B are views showing another part of the nibble stream and a MIDI data word restored therefrom.
Figure 29A:
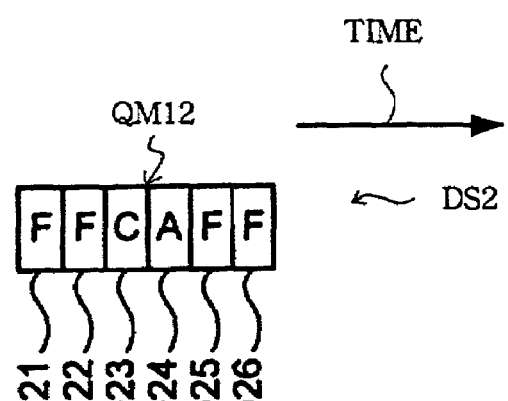
FIGS. 29A and 29B are views showing yet another part of the nibble stream and a MIDI data word restored therefrom.

The nibble stream DS2 is assumed to contain a nibble string D1 to D10, D11 to D19 and D21 to D26 shown in FIGS. 27A, 28A and 29A. The data converter 323 starts the execution at step SB1. The nibble string D1 to D10 contains a quasi MIDI data word QM10 equivalent to hexadecimal number [904F0F], and the other data nibbles D1, D2, D9 and D10 are the synchronous data nibbles [F]. The nibble string D11 to D19 contains another quasi MIDI data word QM11 equivalent to hexadecimal number [C4020], and the nibble string D21 to D26 contains yet another quasi MIDI data word QM12 equivalent to hexadecimal number [CA]. Other data nibbles D11, D12, D18, D19, D21, D22, D25 and D26 are the synchronous nibbles [F].

The data converter 323 checks the data input port thereof to see whether or not any data nibble reaches the data input port as by step SB2. Before the signal demodulating module 31 restores the nibble stream DS2, the nibble stream DS2 does not reach the data input port of the data converter 323, and the answer at step SB2 is given negative. The data converter 323 checks the data input port for the nibble stream DS2, again. Thus, the data converter 323 repeatedly executes the step SB2 until reception of the nibble stream DS2.

When the first data nibble D1 reaches the data input port, the answer at step SB2 is changed to the positive answer, and the data converter 323 proceeds to step SB3. The data converter 323 checks the received data nibble to see whether or not the received data nibble is the synchronous nibble [F] at step SB3. The first data nibble DI is equivalent to hexadecimal number [F], and serves as the synchronous data nibble. Then, the data converter 323 makes a decision that the received nibble D1 is to be ignored as by step SB4, and returns to the step SB2. Thus, the data converter 323 eliminates the synchronous nibble [F] from the nibble stream DS2 through the loop consisting of steps SB2, SB3 and SB4, and, accordingly, a data processing for eliminating the synchronous nibble [F] is achieved through the loop consisting of steps SB2 to SB4.

Subsequently, the second data nibble D2 reaches the data converter 323, and the data converter 323 also decides to ignore the second data nibble D2 through the loop consisting of steps SB2, SB3 and SB4.

When the third data nibble D3 reaches the data converter 323, the answers at steps SB2 is given affirmative, but the answer at step SB3 is given negative. Then, the data converter 323 checks the received data nibble to see whether or not the received data nibble is equivalent to hexadecimal number [C] as by step SB5. The third data nibble is equivalent to hexadecimal number [9], and the answer at step SB5 is given negative. The data converter 323 decides that the third data nibble D3 is the most significant nibble of the received quasi MIDI data word QM10.

With the positive decision at step SB6, the data converter 323 proceeds to step SB20, and checks the data input port to see whether or not the next data nibble reaches there. While the next data nibble does not appear, the data converter 323 repeatedly checks the data input port for the next data nibble, and waits for it. When the next data nibble reaches the data input port, the answer at step SB20 is given affirmative, and the data converter 323 determines that the received data nibble and the previous data nibble form the MIDI status byte as by step SB21. In this instance, the fourth data nibble D4 is equivalent to hexadecimal number [0], and the data converter 323 determines the MIDI status byte is equivalent to hexadecimal number [90]. The data converter 323 determines that the first data nibble except [C] immediately after the synchronous data nibble [F] is the first data nibble of the MIDI status byte in the data stream DS2 through the data processing at steps SB5, SB6, SB20 and SB21.

Figure 27B:
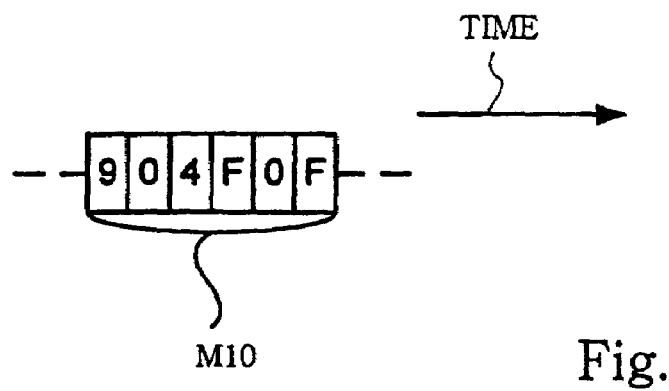

The MIDI standards define the number of the MIDI data bytes to follow the MIDI status byte, and the data converter 323 has a list defining the relation between the MIDI status bytes and the associated MIDI data bytes. The data converter 323 checks the list for the MIDI data bytes to follow the MIDI status byte [90], and finds that two MIDI data bytes are to follow as by step SB22. The data converter 323 receives the data nibbles D5, D6, D7 and D8 as by step SB23. The quasi MIDI data word QM10 has not been subjected to the data conversion, and the data converter 323 decides that the nibble string D3 to D8 [904F0F] represents the MIDI data word M10 (see FIG. 27B) as by step SB24. Thus, the data converter 323 selects the MIDI data bytes from the data stream DS2 through the data processing at steps SB22, SB23 and SB24.

Upon completion of restoration of the MIDI data word [904F0F], the data converter 323 returns to step SB2, and eliminates the synchronous data nibbles [F] D9, D10, D11 and D12 from the data stream DS2 through the loop consisting of steps SB2 to SB4.

When the data nibble D13 reaches the data converter 323, the answer at step SB2 is given affirmative, and the answer at step SB3 is given negative. Then, the data converter 323 proceeds to step SB5, and checks the received data nibble to see whether or not it is equivalent to hexadecimal number [C]. The received data nibble D13 is equivalent to hexadecimal number [C] (see FIG. 28A), and the answer at step SB5 is given affirmative. Then, the data converter 323 checks the data input port to see whether or not the next data nibble is received as by step SB10, and waits for it. When the next data nibble D13 reaches the data converter 323, the answer at step SB10 is given affirmative, and the data converter 323 checks the received data nibble to see whether or not it is equivalent to hexadecimal number [4] as by step SB11. The data nibble D13 is equivalent to hexadecimal number [4], and the answer at step SB11 is given affirmative. Then, the data converter 323 decides that the previous received data nibble [C] is the most significant nibble of the next MIDI status byte as by step SB12.

Figure 28B:
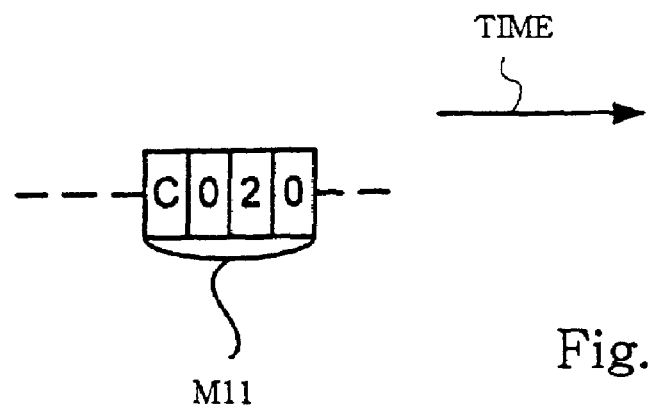

The data converter 323 waits for the next data nibble at step SB20. The next data nibble D15 is equivalent to hexadecimal number [0], and determines that the received data nibble [0] is the least significant nibble of the MIDI status byte. In other words, the data nibble [C] and the data nibble [0] form the MIDI status byte M11. Thus, the data converter 323 removes the data nibble [4] from the quasi MIDI status data code QM11, and restores the MIDI status byte [C0] (see the first row of the data conversion table 116 in FIG. 4). The data converter 323 checks the list for the MIDI data bytes associated with the MIDI status byte [C0] at step SB22. Only one data byte is to follow the MIDI status byte [C0], and receives the data nibbles D16 and D17 as the MIDI data byte at step SB23. The data converter 323 eliminates the data nibbles D11 to D19 from the data stream DS2, and restores the MIDI data word M11 equivalent to hexadecimal number [C020] (see FIG. 28B) at step SB24.

Any MIDI status byte with the most significant nibble [5] is not presently defined in the MIDI standards. However, a data nibble equivalent to hexadecimal number [5] may reach the data processor 23 at the position presently occupied by the data nibble D14. In this case, the answer at step SB11 is given negative, and the data converter 323 proceeds to step SB13. The data converter 323 checks the received data nibble to see whether or not it is equivalent to hexadecimal number [5]. The answer at step SB13 is given affirmative, and the data converter 323 determines the most significant nibble is [F] (see the data conversion table 116) as by step SB14, and waits for the next data nibble at step SB20. The next data nibble is either [4] or [5], and the data processor 23 determines that the received data nibble [4] or [5] is the least significant nibble of the MIDI status byte at step SB21. The data converter 323 checks the list for the number of data bytes at step SB22, and receives the data byte or bytes at step SB23.

Figure 29B:
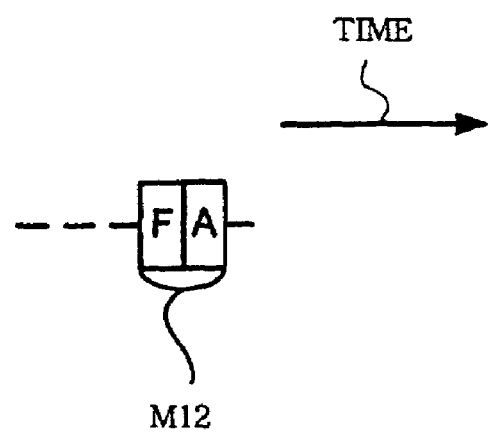

The data converter 323 eliminates the synchronous data nibbles D18, D19, D21 and D22 through the loop consisting of steps SB2, SB3 and SB4. When the data nibble D23 reaches the data converter 323, the answer at step SB2 is given affirmative. The received data nibble D23 is equivalent to hexadecimal number [C], and the answer at step SB3 and the answer at step SB5 are given negative and affirmative, respectively. Then, the data converter 323 waits for the next data nibble D24 at step SB10. The data nibble D24 is equivalent to hexadecimal number [A], and the answers at steps SB11 and SB13 are given negative. Then, the data converter 323 proceeds to step SB15, and determines the data nibble [F] and the presently received data nibble D24 form the MIDI status byte as by step SB15 (see the sixteenth row of the data conversion table 16), and checks the list for the number of data bytes at step SB22. The status byte [FA] means the instruction "start", and any data byte does not follow the status byte. For this reason, the data converter 323 determines that the nibble string D21 to D26 contain the MIDI data word M12 equivalent to hexadecimal number [FA] (see FIG. 29B) at step SB24.

The data converter 323 eliminates the synchronous data nibbles D25 and D26 through the loop consisting of steps SB2 to SB4, and waits for the next data nibble.

The MIDI data words M1, M11 and M12 are supplied to the tone generator in a real time fashion, and tone generator produces the audio signal from the MIDI data words. The audio signal is supplied to the sound system, and electronic tones are radiated from the sound system.

Thus, the data converter 323 determines the MIDI status byte through the data processing at steps SB5, SB6, SB10 to SB15, SB20 and SB21. For this reason, the data processing at these steps SB5, SB6, SB10 to SB15, SB20 and SB21 is referred to as "data processing for determining a status byte". As described hereinbefore, the data converter 23 determines the data bytes through the data processing at steps SB22 to SB24 which is referred to as "data processing for determining data bytes". The MIDI data word is restored through the data processing at steps SB5, SB6, SB10 to SB15 and SP20 to SB24. Thus, the data processing for restoring a MIDI data word is broken down into the data processing for determining a status byte and the data processing for determining data bytes.

Figure 30:
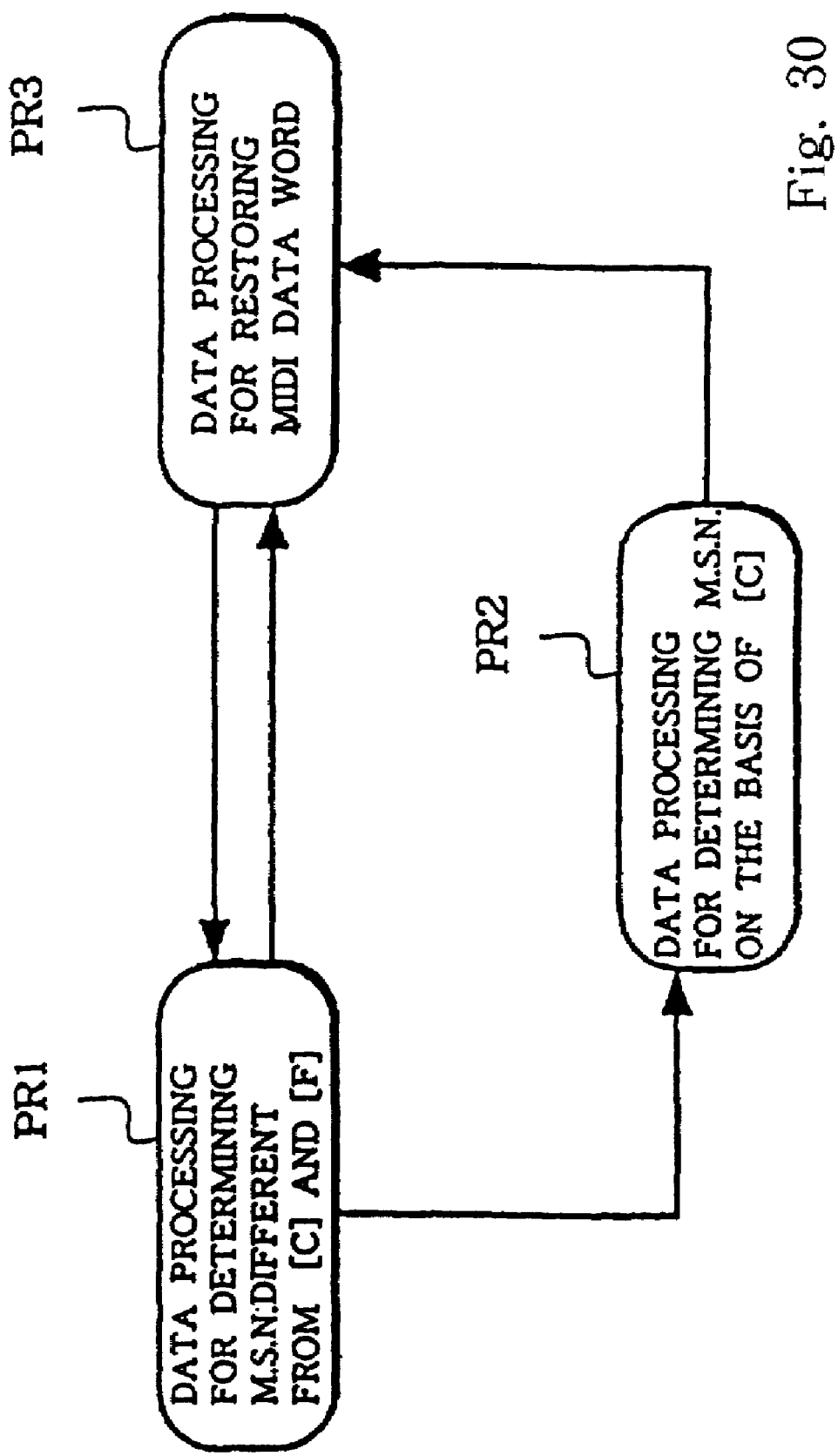
FIG. 30 is a view showing a concept of a method for restoring MIDI data words from the nibble stream from another aspect.

The most significant nibbles [C] and [F] are converted to the data codes [C4], [C] and [C5] before the recording. The method shown in FIG. 26 may be broken down into a data processing PR1 for determining the most significant nibble different from the data nibbles [C] and [F], a data processing PR2 for determining the most significant nibble on the basis of the data nibble [C] and a data processing PR3 for restoring a MIDI data word as shown in FIG. 30. The data processing PR1 is carried out at steps SB2, SB3, SB4, SB5 and SB6, and the data processing PR2 is carried out at steps SB10 to SB15. The data processing RP3 is carried out at steps SB20 to SB24. When the most significant nibble is determined through the data processing PR1, the data converter 323 directly proceeds to the data processing PR3, and returns from the data processing PR3 to the data processing PR1. However, if the most significant nibble is not determined through the data processing PR1, the data converter 323 determines the most significant nibble through the data processing PR2, and, thereafter, proceeds to the data processing PR3.

Although the synchronous data nibbles were supplemented into the irregular intervals between the MIDI data words, the synchronous data nibbles are eliminated from the continuous nibble stream DS2. Neither start bit nor stop bit is required for any of the MIDI data words. For this reason, the MIDI messages are transferred at high transfer efficiency.

As will be understood from the foregoing description, although the various kinds of modulation techniques are employed to produce the analog audio signal AD1 from the nibble stream, the detector 100 checks the regenerative signal RG1 to see what kind of modulation technique was employed, and decides the modulating technique used in the sound recorder 10 or the uncertainty, i.e., the predetermined modulating techniques were not used. The detector 100 notifies the determination to the demodulator 30A, and the demodulator 30A restores the MIDI data words through the appropriate demodulating technique. Thus, even if the different modulating techniques are employed in the sound recorders, they are available for the information transmission system according to the present invention.

Second Embodiment

Figure 31:
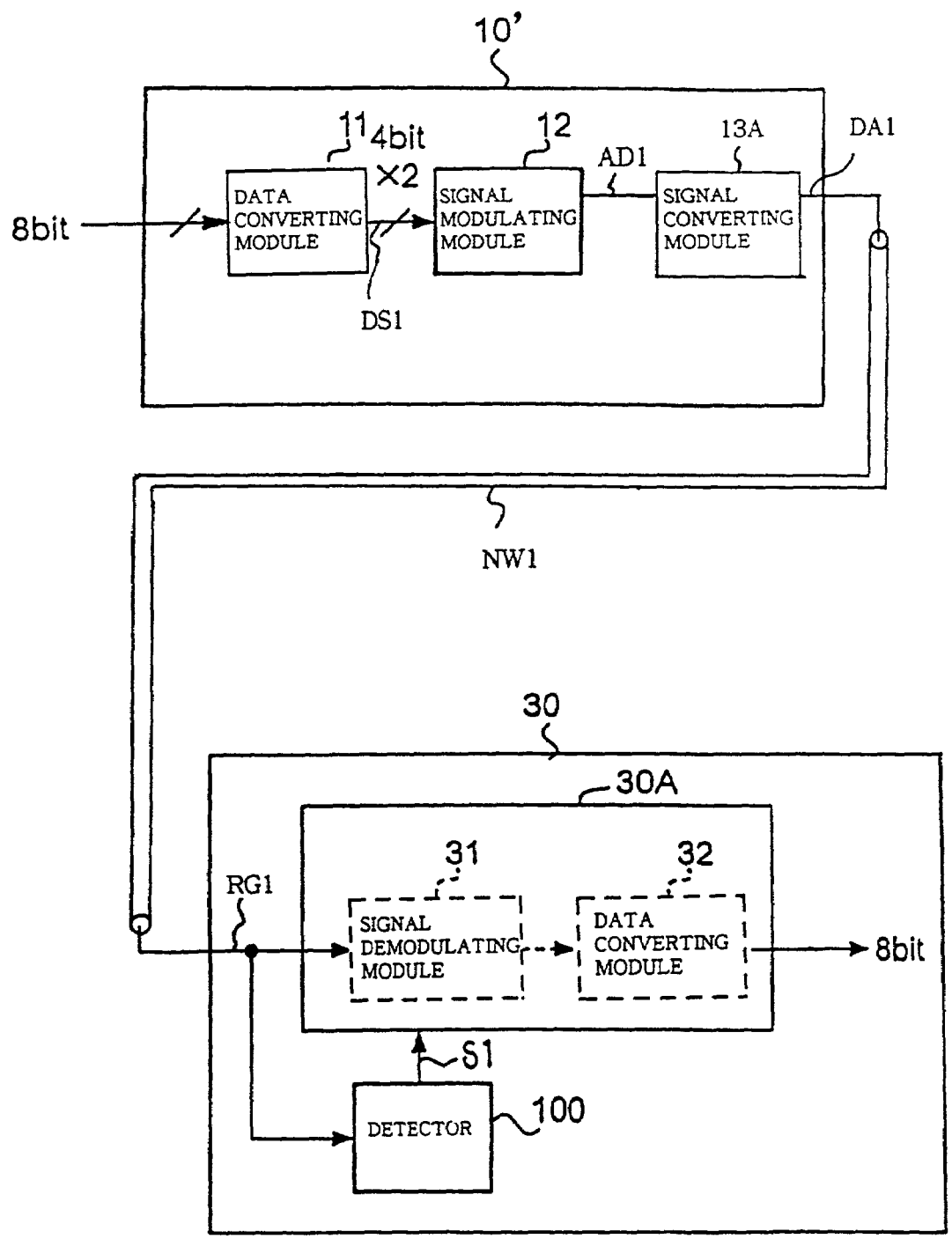
FIG. 31 is a block diagram showing the system configuration of a communication system according to the present invention.

FIG. 31 shows another information transmission system embodying the present invention. The recording module 13 is replaced with a signal interface 13A. The signal interface 13A converts the analog audio signal AD1 to the digital audio signal DA1 through the PCM, and transmits the digital audio signal DA1 through a wire communication network NW1 to the sound reproducer 30. The signal converting module 11, the signal modulating module 12, the detector 100, the signal demodulating module 31 and the data converting module 32 are similar to those of the first embodiment, and no further description is incorporated hereinbelow for the sake of simplicity.

Third Embodiment

Figure 32:
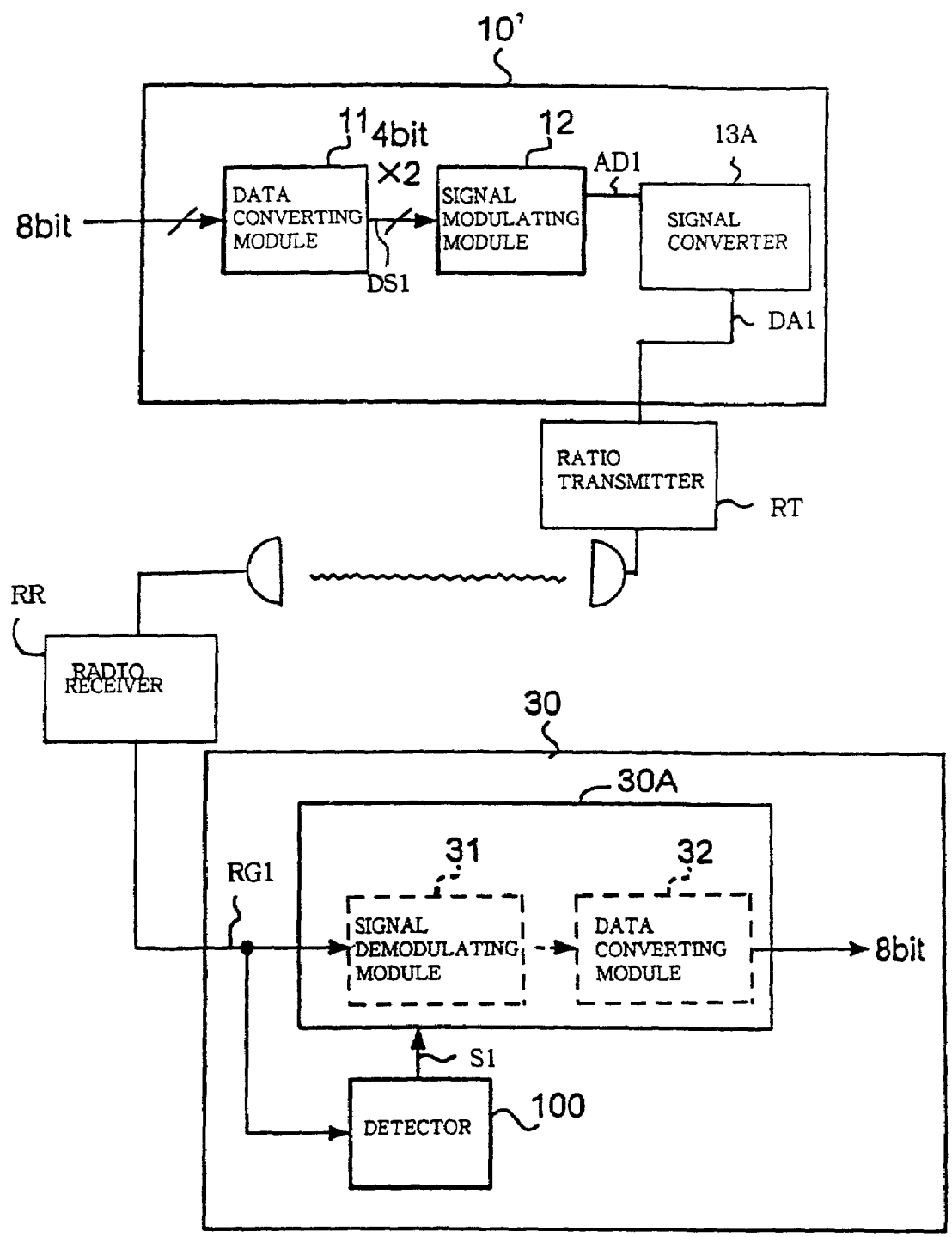
FIG. 32 is a block diagram showing the system configuration of another communication system according to the present invention.

FIG. 32 shows another information transmission system embodying the present invention. The wire communication network NW1 is replaced with a radio transmitter RT and a radio receiver RR. The digital audio signal DA1 is subjected to a secondary modulation, and is transmitted from the radio transmitter RT through the free space to the radio receiver RR. The other features are similar to those of the second embodiment, and no further description is incorporated hereinbelow.

In the first embodiment, the sound recorder 10 and the sound reproducer 30 are corresponding to a firsts station and a second station, respectively, and the magneto-optic disc serves as an information transmitting medium. On the other hand, the first station and the second station are labeled with references 10' and 30 in the second embodiment, and the wire communication network NW serves as the information transmitting medium. The radio transmitter and the radio receiver are further incorporated in the first station and the second station in the third embodiment, and the free space serves as the information transmitting medium.

As will be appreciated from the foregoing description, although the data codes are modulated through a modulating technique selected from the plural candidates, a discriminator specifies the modulating technique, and the demodulator reproduces the data codes. The demodulating technique employed in the demodulator does not set a limit on the first station. Thus, the present invention enhances the flexibility of the information transmission system.

Although particular embodiments of the present invention have been shown and described, it will be apparent to those skilled in the art that various changes and modifications may be made without departing from the spirit and scope of the present invention.

The signal modulation is not limited to the 16 DPSK. A multi-value DPSK technique is available for the signal modulation. If a series of 3-bit data codes forms the nibble stream DS1, the nibble stream is converted to the analog audio signal through 8 DPSK or 24 DPSK. Similarly, if a series of 2-bit data codes forms the nibble stream DS1, the nibble stream is converted to the analog audio signal through 4 DPSK or 22 DPSK. The multi-value may be more than 2.

The spacious arrangement of gray codes may be different from that shown in FIG. 12 in so far as the relative phase is changed for a series of synchronous nibbles.

The MIDI music data words may be used for controlling an apparatus such as, for example, a stage lightning system or an image producing system.

An information transmission system according to the present invention may have more than two information processing stations connected through the information transmission medium. In this instance, each of the information processing stations has both of the sound recorder and the sound reproducer.

What is claimed is:

1. An information transmission system comprising:
a first station connected to a data source supplying data codes thereto at irregular intervals, and including
a first data converter inserting synchronous codes into said irregular intervals for producing a modulating signal,
a modulating unit modulating a carrier signal with said modulating signal for producing a modulated signal on the basis of said data codes through a modulating technique selected from plural candidates and
a data converting unit connected to said modulating unit for producing an output signal from said modulated signal;
a second station supplied with said output signal of said data converting unit, and including
a discriminating unit analyzing said output signal so as to determine said modulating technique employed in said modulating unit and producing a control signal representative of said modulating technique,
a demodulating unit supplied with said output signal of said data converting unit, capable of demodulating said output signal through any one of demodulating techniques respectively corresponding to said candidates and responsive to said control signal for producing a demodulated signal through the demodulating technique corresponding to said modulating technique, and
a second data converter connected to said demodulating unit and eliminating said synchronous codes from said demodulated signal so as to reproduce said data codes; and
an information transmitting medium provided between said first station and said second station.

2. The information transmission system as set forth in claim 1, in which said first station further includes a third data converter connected between said data source and said first data converter and replacing the data codes identical in bit string with said synchronous codes with quasi data codes for producing said modulating signal, and in which said second data converter is further operative to restore said data codes from said quasi data codes.

3. The information transmission system as set forth in claim 1, in which said information transmitting medium is a portable memory for storing pieces of data information on said output signal.

4. The information transmission system as set forth in claim 3, in which said portable memory is a magneto-optic disc.

5. The information transmission system as set forth in claim 1, in which said information transmitting medium is a wire communication network.

6. The information transmission system as set forth in claim 1, in which said information transmitting medium is a free space.

7. An information transmission system comprising:
a first station connected to a data source supplying data codes containing pieces of music data information representative of a performance thereto at irregular interval, and including
a first data converting unit supplying synchronous codes into said irregular intervals for producing a data stream,
a modulating unit connected to said first data converting unit and modulating a carrier signal with said data stream for producing a modulated signal through a modulating technique selected from plural candidates and
a second data converting unit connected to said modulating unit for producing an output signal from said modulated signal;
a second station supplied with said output signal of said second data converting unit, and including
a discriminating unit analyzing said output signal so as to determine said modulating technique employed in said modulating unit and producing a control signal representative of said modulating technique,
a demodulating unit supplied with said output signal of said second data converting unit, capable of demodulating said output signal through any one of demodulating techniques respectively corresponding to said candidates and responsive to said control signal for reproducing said data stream through the demodulating technique corresponding to said modulating technique and a third data converting unit connected to said demodulating unit and reproducing said data codes from said data stream; and an information transmitting medium provided between said first station and said second station.

8. The information transmission system as set forth in claim 7, in which said first data converting unit is further operative to replace the data codes identical in bit string with said synchronous codes with quasi data codes for producing said data stream, and in which said third data converting unit is further operative to restore said data codes from said quasi data codes.

9. The information transmission system as set forth in claim 7, in which said information transmitting medium is a portable memory for storing pieces of data information on said output signal.

10. The information transmission system as set forth in claim 9, in which said portable memory is a magneto-optic disc.

11. The information transmission system as set forth in claim 7, in which said information transmitting medium is a wire communication network.

12. The information transmission system as set forth in claim 7, in which said information transmitting medium is a free space.

13. The information transmission system as set forth in claim 7, in which said modulated signal causes said output signal to have edge-to-edge intervals different between said candidates so that said discriminating unit measures the edge-to-edge intervals for determining said modulating technique.

14. The information transmission system as set forth in claim 13, in which said discriminating unit determines that said output signal does not contain said pieces of music data information when said edge-to-edge intervals are inconsistent with those of said candidates.

15. An information transmission system comprising:
a first station connected to a data source supplying data codes thereto at irregular interval, and including
a modulating unit producing a modulated signal on the basis of said data codes through a modulating technique selected from plural candidates and
a data converting unit connected to said modulating unit for producing an output signal from said modulated signal, said output signal having edge-to-edge intervals different between said candidates;
a second station supplied with said output signal of said data converting unit, and including
a measuring unit for measuring said edge-to-edge intervals of said output signal,
a discriminating unit connected to said measuring unit, determining said modulating technique employed in said modulating unit on the basis of said edge-to-edge intervals and producing a control signal representative of said modulating technique and
a demodulating unit supplied with said output signal of said data converting unit, capable of demodulating said output signal through any one of demodulating techniques respectively corresponding to said candidates and responsive to said control signal for reproducing said data codes through the demodulating technique corresponding to said modulating technique; and
an information transmitting medium provided between said first station and said second station.

16. The information transmission system as set forth in claim 15, in which said first station further includes a first data converter inserting synchronous codes into said irregular intervals for producing a modulating signal so that said modulating unit modulates a carrier signal with said modulating signal for producing said modulated signal, and in which said second station further includes a second data converter connected to said demodulating unit and eliminating said synchronous codes from a demodulated signal supplied from said demodulating unit.

17. The information transmission system as set forth in claim 16, in which said first station further includes a third data converter connected between said data source and said first data converter and replacing the data codes identical in bit string with said synchronous codes with quasi data codes for producing said modulating signal, and in which said second data converter is further operative to restore said data codes from said quasi data codes.

18. The information transmission system as set forth in claim 15, in which said information transmitting medium is a portable memory for storing pieces of data information on said output signal.

19. The information transmission system as set forth in claim 18, in which said portable memory is a magneto-optic disc so that said output signal is produced from said modulated signal through a pulse code modulation.

20. The information transmission system as set forth in claim 15, in which said information transmitting medium is a wire communication network.

21. The information transmission system as set forth in claim 15, in which said information transmitting medium is a free space.

22. The information transmission system as set forth in claim 15, in which said data codes contain pieces of music data information representative of a performance.

23. The information transmission system as set forth in claim 22, in which said first station further includes a first data converter inserting synchronous codes into said irregular intervals for producing a modulating signal so that said modulating unit modulates a carrier signal with said modulating signal for producing said modulated signal, and in which said second station further includes a second data converter connected to said demodulating unit and eliminating said synchronous codes from a demodulated signal supplied from said demodulating unit so as to restore said data codes representative of said pieces of music data information.

24. The information transmission system as set forth in claim 23, in which said first station further includes a third data converter connected between said data source and said first data converting unit and replacing the data codes identical in bit string with said synchronous codes with quasi data codes for producing said modulating signal, and in which said second data converter is further operative to restore said data codes from said quasi data codes.

25. A method for transmitting pieces of information from a first station to a second station, comprising the steps of:
a) producing a modulated signal from data codes supplied from a data source at irregular intervals through a modulating technique selected from plural candidates through sub-steps including
a-1) inserting synchronous codes into said irregular intervals for producing a data stream serving as a modulating signal and
a-2) modulating a carrier signal with said data steam for producing said modulated signal;
b) converting said modulated signal to an output signal;

c) transmitting said output signal from said first station through an information transmitting. medium to said second station;

d) analyzing said output signal for determining said modulating technique;

e) selecting a demodulating technique corresponding to said modulating technique from candidates corresponding to said plural candidates; and f) reproducing said data codes through said demodulating technique.

26. The method as set forth in claim 25, in which said step c) includes the sub-steps of c-1) producing said output signal through a pulse code modulation from said modulated signal, c-2) storing said output signal in a magneto-optic disc, and c-3) conveying said magneto-optic disc from said first station to said second station.

27. The method as set forth in claim 25, in which said step d) includes the sub-steps of d-1) measuring edge-to-edge intervals of said output signal, and d-2) comparing said edge-to-edge intervals with plural sorts of edge-to-edge intervals unique to said plural candidates, respectively, for determining said modulating technique.

* * * * *